US012718437B2

(12) United States Patent
Thiebaut et al.

(10) Patent No.: US 12,718,437 B2
(45) Date of Patent: Aug. 25, 2026

(54) IMAGE TEXT TRANSLATION WITH STYLE MATCHING

(71) Applicant: Roblox Corporation, San Mateo, CA (US)

(72) Inventors: Nicolas Thiebaut, San Francisco, CA (US); Dao Le, San Jose, CA (US); Xiao Yu, San Mateo, CA (US); Kyle Joseph Spence, Redwood City, CA (US); Nameer Hirschkind, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 107 days.

(21) Appl. No.: 18/740,478

(22) Filed: Jun. 11, 2024

(65) Prior Publication Data

US 2025/0378604 A1 Dec. 11, 2025

(51) Int. Cl.
*G06T 11/60* (2026.01)
*G06F 40/51* (2020.01)
(Continued)

(52) U.S. Cl.
CPC .............. *G06T 11/60* (2013.01); *G06F 40/51* (2020.01); *G06F 40/58* (2020.01); *G06T 11/23* (2026.01);
(Continued)

(58) Field of Classification Search
CPC ... G06T 11/60; G06T 11/203; G06T 2210/12; G06F 40/51; G06F 40/58; G06V 30/153; G06V 30/19147; G06V 30/1916
See application file for complete search history.

(56) References Cited

U.S. PATENT DOCUMENTS

| | | | | |
|---|---|---|---|---|
| 8,442,311 | B1 * | 5/2013 | Hobbs | G06T 9/00 382/166 |
| 2004/0260535 | A1 * | 12/2004 | Chen | G06F 9/543 704/9 |

(Continued)

OTHER PUBLICATIONS

Avrahami, et al., "Blended Diffusion for Text-Driven Editing of Natural Images", In 2022 IEEE/CVF Conference on Computer Vision and Pattern Recognition (CVPR), 2022, 11 pages.

(Continued)

*Primary Examiner* — Michael Le
(74) *Attorney, Agent, or Firm* — IP Spring

(57) ABSTRACT

Some implementations relate to translating text within images in a virtual environment while preserving the original style and visual characteristics of the text. In some implementations, the method includes obtaining an original image that includes text in a source language; recognizing content of the text and generating translated text in a target language; determining a text region of the text in the original image; determining a style encoding for the text; generating a masked version and noisy version of the original image; providing the noisy version, masked version, and text region as direct inputs to a pre-trained diffusion model; providing the translated text and the style encoding as conditioning inputs to the diffusion model; and obtaining an output image including the translated text, where a visual style of the translated text in the output image is the same as the visual style of the text in the original image.

20 Claims, 12 Drawing Sheets

(51) Int. Cl.

| | |
|---|---|
| ***G06F 40/58*** | (2020.01) |
| ***G06T 11/23*** | (2026.01) |
| ***G06V 30/148*** | (2022.01) |
| ***G06V 30/19*** | (2022.01) |

(52) U.S. Cl.
CPC ...... *G06V 30/153* (2022.01); *G06V 30/19147* (2022.01); *G06V 30/1916* (2022.01); *G06T 2210/12* (2013.01)

(56) References Cited

U.S. PATENT DOCUMENTS

| | | | | |
|---|---|---|---|---|
| 2012/0163668 | A1* | 6/2012 | Englund | G06V 20/62 382/103 |
| 2014/0081619 | A1* | 3/2014 | Solntseva | G06F 40/58 704/3 |
| 2015/0134318 | A1* | 5/2015 | Cuthbert | G06F 40/58 715/231 |
| 2015/0310291 | A1* | 10/2015 | Cuthbert | G06V 30/142 382/182 |
| 2024/0104312 | A1* | 3/2024 | Stone | G06F 40/58 |
| 2024/0111968 | A1* | 4/2024 | Umapathy | G06V 30/10 |
| 2025/0299396 | A1* | 9/2025 | Ji | G06F 40/109 |
| 2025/0322179 | A1* | 10/2025 | Sharma | G06F 40/58 |

OTHER PUBLICATIONS

Chen, et al., "DiffUTE: Universal Text Editing Diffusion Model", https://arxiv.org/abs/2305.10825, May 18, 2023, 13 pages.

Ji, et al., "Improving Diffusion Models for Scene Text Editing with Dual Encoders", https://arxiv.org/abs/2304.05568, Apr. 11, 2023, 22 pages.

Li, et al., "TrOCR: Transformer-Based Optical Character Recognition with Pre-Trained Models", https://arxiv.org/abs/2109.10282, Sep. 6, 2022, 10 pages.

Ye, et al., "IP-Adapter: Text Compatible Image Prompt Adapter for Text-to-Image Diffusion Models", https://arxiv.org/abs/2308.06721, Aug. 13, 2023, 16 pages.

* cited by examiner

612

610

IMAGE TEXT TRANSLATION WITH STYLE MATCHING

TECHNICAL FIELD

Implementations relate generally to the field of image processing. More specifically, implementations relate to methods, systems and computer readable media for translating text within images in a virtual environment while preserving the original style and visual characteristics of the text.

BACKGROUND

The proliferation of virtual environments and digital media has led to an increased demand for multilingual support within these virtual environments. Games, virtual environments, communication platforms, and more often require or benefit from text translations to cater to a global audience. Traditionally, text translation within images or scenes has relied on manual processes or simplistic automated tools that fail to preserve the original stylistic and aesthetic characteristics of the text. These methods often result in translations that are visually incongruent with the original content, disrupting user immersion and engagement.

Existing automated translation systems primarily focus on translating plain text, without considering the style, font, or layout of the original text within an image. This limitation is particularly problematic in scenarios where text is a part of complex visual content, such as signs, labels, or branded elements in a virtual environment. The mismatch between the translated text and the original design can lead to a jarring visual experience, reducing the effectiveness of the communication and negatively impacting user perception.

Another significant issue with current state-of-the-art techniques is the lack of adaptability and precision in handling varied styles of text. Traditional Optical Character Recognition (hereinafter "OCR") systems combined with translation algorithms are not designed to retain the stylistic elements of the source text, leading to a loss of important contextual and visual cues. Furthermore, these systems often struggle with inaccurate text recognition and translation. These challenges highlight the need for a more sophisticated approach that can seamlessly integrate text translation within images while maintaining the visual integrity and style of the original content.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, systems, and computer-readable media for translating text within images in a virtual environment while preserving the original style and visual characteristics of the text.

According to one aspect, a computer implemented method obtains an original image that includes text in a source language; recognizes content of the text in the original image and generates translated text including a translation of the content of the text, where the translated text is in a target language; determines a text region of the text in the original image, where the text region includes a subset of pixels of the original image; determines a style encoding for the text in the original image, where the style encoding is a mathematical representation of a visual style of the text in the original image; generates a masked version of the original image by setting the subset of pixels corresponding to the text region to a fixed value; generates a noisy version of the original image; provides the noisy version of the original image, the masked version of the original image, and the text region as direct inputs to a pre-trained diffusion model; provides the translated text and the style encoding as conditioning inputs to the pre-trained diffusion model; and obtains, as output of the diffusion model, an output image that includes the translated text, where a visual style of the translated text in the output image is the same as the visual style of the text in the original image and where the output image is within a threshold visual distance of the original image.

In some implementations, the computer-implemented method includes the original image including an image asset from a virtual experience.

In some implementations, the computer-implemented method includes rendering a virtual experience that includes the output image. In some implementations, the computer-implemented method includes determining the target language based on one of: a user profile of a user that participates in a virtual experience, or a user location of the user.

In some implementations, the computer-implemented method includes determining the text region in the original image including: identifying text pixels of the original image that correspond to the content of the text; and generating a bounding box that includes all of the text pixels, wherein providing the text region to the pre-trained diffusion model includes providing the bounding box. In some implementations, the computer-implemented method includes generating the masked version of the original image including replacing pixel values of pixels within the bounding box with a fixed value.

In some implementations, the computer-implemented method includes generating the translated text including: applying a translation algorithm to the content of the text to generate the translated text; and rendering the translated text in a standard font, wherein providing the translated text to the pre-trained diffusion model includes providing the rendered translated text in the standard font. In some implementations, the computer-implemented method includes the content of the text including one or more alphanumerical symbols, and further including: generating, using a text encoder, a set of vectors, wherein each vector of the set of vectors encodes a respective symbol of the one or more alphanumerical symbols, wherein providing the translated text to the pre-trained diffusion model further includes providing the set of vectors.

In some implementations, the computer-implemented method includes determining the style encoding for the text region of the original image including providing the text region of the original image as input to a style encoder, wherein the style encoder outputs the style encoding. In some implementations, the computer-implemented method includes the style encoder having a bottleneck architecture, wherein the text region of the original image is distilled into a small vector that prevents memorization of the input text while retaining visual attributes of the text region, wherein the visual attributes include color of the text, shape of the text, and combinations thereof.

In some implementations, the computer-implemented method includes providing a prompt as an additional conditioning input to the pre-trained diffusion model, wherein the prompt includes a command to write the translated text in the output image.

In some implementations, the computer-implemented method includes the conditioning inputs being provided as respective conditioning vectors to the pre-trained diffusion model, and further including: computing cross-attention vectors individually; and summing the contribution of the cross-attention vectors through residual layers of the pre-trained diffusion model.

In some implementations, the computer-implemented method includes the direct inputs being part of an encoding and decoding process of the pre-trained diffusion model, and wherein the conditioning inputs control the output image generation process of the pre-trained diffusion model.

In some implementations, the computer-implemented method includes the diffusion model being trained by: obtaining a training set, wherein each element of the training set includes: a training image that includes text within a text region; a noisy version of the training image; a masked version of the training image, where a subset of pixels corresponding to the text region of the training image are set to a fixed value to mask the text region; the text region; and a style encoding for the text in the training image, where the style encoding is a mathematical representation of a visual style of the text in the training image. The computer-implemented method then trains the diffusion model via self-supervised learning, where the training includes, for each element of the training set: providing the noisy version of the training image, the masked version of the training image, and the text region as direct inputs to the diffusion model; providing original text from the text region and the style encoding as conditioning inputs to the diffusion model; generating, by the diffusion model, an output image, by iteratively denoising the noisy version of the training image; determining a loss value based on a comparison of the output image and the training image; and modifying one or more parameters of the diffusion model based on the loss value.

According to another aspect, a system includes one or more processors and memory coupled to the one or more processors storing instructions that, when executed by the one or more processors, cause the system to perform operations including: obtaining an original image that includes text in a source language; recognizing content of the text in the original image and generating translated text including a translation of the content of the text, where the translated text is in a target language; determining a text region of the text in the original image, where the text region includes a subset of pixels of the original image; determining a style encoding for the text in the original image, where the style encoding is a mathematical representation of a visual style of the text in the original image; generating a masked version of the original image by setting the subset of pixels corresponding to the text region to a fixed value; generating a noisy version of the original image; providing the noisy version of the original image, the masked version of the original image, and the text region as direct inputs to a pre-trained diffusion model; providing the translated text and the style encoding as conditioning inputs to the pre-trained diffusion model; and obtaining, as output of the diffusion model, an output image that includes the translated text, where a visual style of the translated text in the output image is the same as the visual style of the text in the original image and where the output image is within a threshold visual distance of the original image.

In some implementations, the system includes the original image including an image asset from a virtual experience.

In some implementations, the instructions cause the system to perform an operation comprising rendering a virtual experience that includes the output image.

In some implementations, the instructions cause the system to perform an operation comprising determining the target language based on one of: a user profile of a user that participates in a virtual experience, or a user location of the user.

In some implementations, the system includes determining the text region in the original image including: identifying text pixels of the original image that correspond to the content of the text; and generating a bounding box that includes all of the text pixels, wherein providing the text region to the pre-trained diffusion model includes providing the bounding box.

According to another aspect, a non-transitory computer readable medium with instructions stored thereon is provided. The instructions stored thereon that, when executed by one or more processors, cause the one or more processors to perform operations. The operations include: obtaining an original image that includes text in a source language; recognizing content of the text in the original image and generating translated text including a translation of the content of the text, where the translated text is in a target language; determining a text region of the text in the original image, where the text region includes a subset of pixels of the original image; determining a style encoding for the text in the original image, where the style encoding is a mathematical representation of a visual style of the text in the original image; generating a masked version of the original image by setting the subset of pixels corresponding to the text region to a fixed value; generating a noisy version of the original image; providing the noisy version of the original image, the masked version of the original image, and the text region as direct inputs to a pre-trained diffusion model; providing the translated text and the style encoding as conditioning inputs to the pre-trained diffusion model; and obtaining, as output of the diffusion model, an output image that includes the translated text, where a visual style of the translated text in the output image is the same as the visual style of the text in the original image and where the output image is within a threshold visual distance of the original image.

According to yet another aspect, portions, features, and implementation details of the systems, methods, and non-transitory computer-readable media may be combined to form additional aspects, including some aspects which omit and/or modify some or portions of individual components or features, include additional components or features, and/or other modifications, and all such modifications are within the scope of this disclosure.

DETAILED DESCRIPTION

Figure 1:
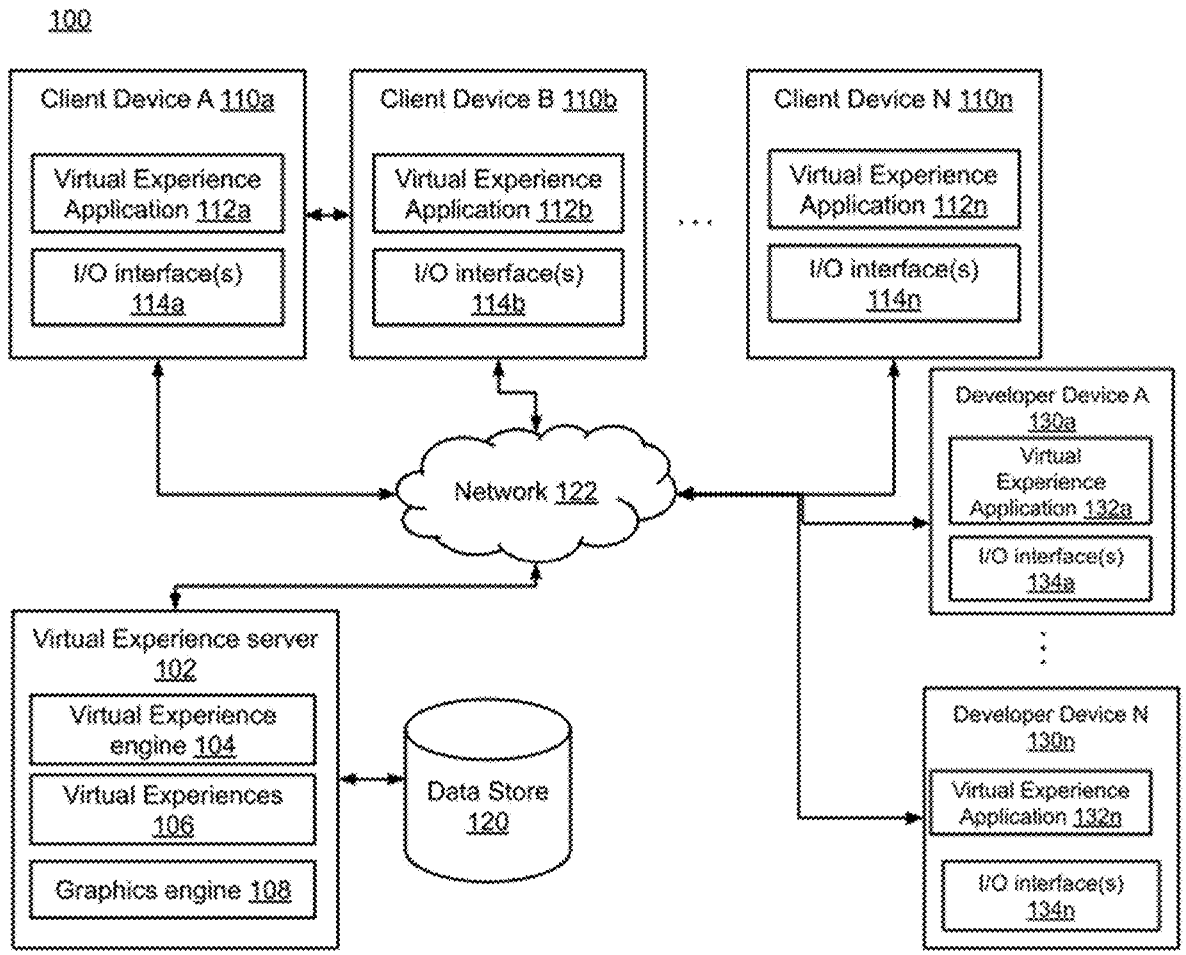
FIG. 1 is a diagram of an example system architecture for providing image text translation with style matching, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

One or more implementations described herein relate to translating text within images while preserving the original visual style of the text. In some implementations, a pretrained diffusion model is used with multiple conditioning inputs, including style encoding, to ensure that the translated text maintains the aesthetic and visual characteristics of the original image. In various embodiments, the technology is utilized in applications such as, e.g., virtual experiences within virtual environments, and game promotions.

Technical advantages of one or more described features can include improved accuracy in text translation and preservation of the original visual style. Using multiple conditioning inputs, such as prompts, rendered text, character-level encoding, and style encoding, ensures that the translated text matches the original design's aesthetic. This results in a seamless integration of the translated text within the image, avoiding visual disruptions and maintaining high visual fidelity.

Another technical advantage is the reduction of artifacts and distortions in the output image. The diffusion model's iterative denoising process and advanced inpainting techniques ensure that the translated text is rendered clearly and accurately, without compromising the image's overall quality. This is particularly beneficial in applications where visual coherence and readability are paramount.

Another technical advantage is in the flexibility in handling various fonts, colors, and text effects, enabling it to generalize to different styles and contexts. This adaptability is crucial for applications in diverse environments, such as gaming and virtual experiences, where maintaining thematic consistency across different languages is essential.

FIG. 1 is a diagram of an example system architecture that can be used to provide mesh retopology for improved animation of three-dimensional avatar heads, in accordance with some implementations. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*," "110*b*," and/or "110*n*" in the figures).

The system architecture 100 (also referred to as "system" herein) includes online virtual experience server 102, data store 120, client devices 110*a*, 110*b*, and 110*n* (generally referred to as "client device(s) 110" herein), and developer devices 130*a* and 130*n* (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowchart shown in FIG. 2. In one or more additional or alternative implementations, the operations described below may be performed on one or more client devices 110, or one or more developer devices 130. In some implementations, where the operations are performed depends at least in part on compute resources, e.g., memory, processing power, or disk space. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on client devices 110.

In some implementations, virtual experience session data are generated via online virtual experience server 102, virtual experience application 112, and/or virtual experience application 132, and are stored in data store 120. With permission from virtual experience participants, virtual experience session data may include associated metadata, e.g., virtual experience identifier(s); device data associated with the participant(s); demographic information of the participant(s); virtual experience session identifier(s); chat transcripts; session start time, session end time, and session duration for each participant; relative locations of participant avatar(s) within a virtual experience environment; purchase(s) within the virtual experience by one or more participants(s); accessories utilized by participants; etc.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between participants.

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be or include a virtual gaming server. For example, the gaming server may provide single-player or multiplayer games to a community of users that may access a "system" herein that includes online gaming server 102, data store 120, and client device 110 and/or may interact with virtual experiences using client devices 110 via network 122. In some implementations, virtual experiences (including virtual realms or worlds, virtual games, other computer-simulated environments) may be two-dimensional (2D) virtual experiences, three-dimensional (3D) virtual experiences (e.g., 3D user-generated virtual experiences), virtual reality (VR) experiences, or augmented reality (AR) experiences, for example. In some implementations, users may participate in interactions (such as gameplay) with other users. In some implementations, a virtual experience may be experienced in real-time with other users of the virtual experience.

In some implementations, virtual experience engagement may refer to the interaction of one or more participants using client devices (e.g., 110) within a virtual experience (e.g., 106) or the presentation of the interaction on a display or other output device (e.g., 114) of a client device 110. For example, virtual experience engagement may include interactions with one or more participants within a virtual experience or the presentation of the interactions on a display of a client device.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "virtual experience environments" or "virtual environments" herein) where multiple environments may be linked. An example of a virtual environment may be a three-dimensional (3D)

environment. The one or more environments of a virtual experience 106 may be collectively referred to as a "world" or "virtual experience world" or "gaming world" or "virtual world" or "virtual space" or "universe" herein. An example of a world may be a 3D world of a virtual experience 106. For example, a user may build a virtual environment that is linked to another virtual environment created by another user. A character (avatar) of the virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters (avatars), decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the online virtual experience server 102. In some implementations, online virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with online virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience applications 106 of the online virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the online virtual experience server 102 (e.g., a public virtual experience). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both.

In some implementations, both the online virtual experience server 102 and client devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on virtual experience engagement conditions. For example, if the number of users engaging in a particular virtual experience 106 exceeds a threshold number, the online virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the online virtual experience server 102. Subsequent to receiving control instructions from the client devices 110, the online virtual experience server 102 may send experience instructions (e.g., position and velocity information of the characters participating in the group experience or commands, such as rendering commands, collision commands, etc.) to the client devices 110 based on control instructions. For instance, the online virtual experience server 102 may perform one or more logical operations (e.g., using virtual experience engine 104) on the control instructions to generate experience instruction(s) for the client devices 110. In other instances, online virtual experience server 102 may pass one or more or the control instructions from one client device 110 to other client devices (e.g., from client device 110*a* to client device 110*b*) participating in the virtual experience 106. The client devices 110 may use the experience instructions and render the virtual experience for presentation on the displays of client devices 110.

In some implementations, the control instructions may refer to instructions that are indicative of actions of a user's character (avatar) within the virtual experience. For example, control instructions may include user input to control action within the experience, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110*b* to client device 110*n*), where the other client device generates experience instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, experience instructions may refer to instructions that enable a client device 110 to render a virtual experience, such as a multiparticipant virtual experience. The experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g., shirts, pants, etc. the online virtual experience platform may provide users access to simplified 3D virtual object models that are represented by a mesh of a low polygon count, e.g., between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character virtual experience object (e.g., body parts, etc.) but the user may control the character (without the character virtual experience object) to facilitate the user's interaction with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience server 102. In some implementations, creating, modifying, or customizing characters, other virtual experience objects, virtual experiences 106, or virtual experience environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, animate or inanimate object, or other creative form.

In some implementations, the online virtual experience server 102 may store characters created by users in the data store 120. In some implementations, the online virtual experience server 102 maintains a character catalog and virtual experience catalog that may be presented to users. In some implementations, the virtual experience catalog includes images of virtual experiences stored on the online virtual experience server 102. In addition, a user may select a character (e.g., a character created by the user or other user) from the character catalog to participate in the chosen virtual experience. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 110 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application may be an online virtual experience server application for users to build, create, edit, upload content to the online virtual experience server 102 as well as interact with online virtual experience server 102 (e.g., engage in virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 130 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or engage in virtual experiences 106 hosted by online virtual experience server 102). As such, the virtual experience application may be provided to the client device(s) 130 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual experiences 106 developed, hosted, or provided by a virtual experience developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with appropriate credentials, a virtual experience developer may obtain access to virtual experience virtual objects, such as in-platform currency (e.g., virtual currency), avatars, special powers, accessories, which are owned by or associated with other users.

In general, functions described in one implementation as being performed by the online virtual experience server 102 can also be performed by the client device(s) 110, or a server, in other implementations if appropriate. In addition, the functionality attributed to a particular component can be performed by different or multiple components operating together. The online virtual experience server 102 can also be accessed as a service provided to other systems or devices through suitable application programming interfaces (hereinafter "APIs"), and thus is not limited to use in websites.

Figure 2:
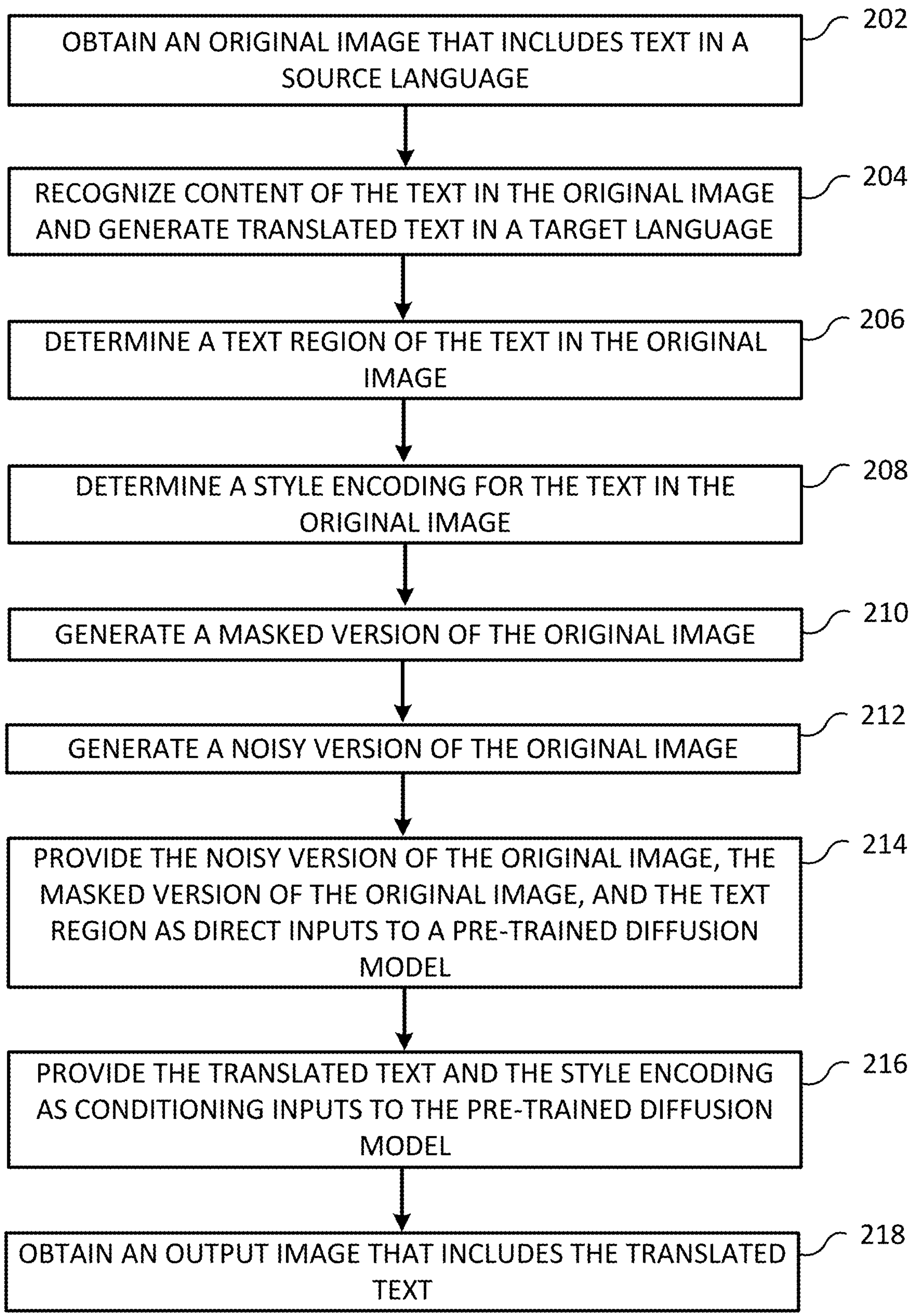
FIG. 2 is a flow diagram illustrating a method for providing image text translation with style matching, in accordance with some implementations.

FIG. 2 illustrates a method of providing image text translation with style matching, in accordance with some implementations. In various embodiments, the blocks shown in FIG. 2 and described below may be performed by any of the elements illustrated in FIG. 1.

At block 202, an original image is obtained that includes text in a source language. In some embodiments, the original image is obtained by receiving the image from one or more components within a virtual environment. These components are programmed to send images to the system when they determine that translation needs to be performed on the original image. In some embodiments, the virtual environment could encompass various applications, such as virtual reality (VR) experiences, augmented reality (AR) scenarios, or immersive gaming environments. For example, within a particular game experience, a component might detect an in-game sign or user interface element containing text that requires translation.

The term "original image", in this context, refers to any digital visual content that includes textual information embedded within it, specifically as part of the virtual environment's assets. These assets can include, for example, textures, virtual signs, user interface elements, and advertisements, either inside of a virtual experience or outside of the virtual experience but within the virtual environment or related platforms or websites. The original image retains all visual characteristics as rendered within the virtual environment, ensuring that the context and visual style are preserved. For instance, a sign in a virtual cityscape or a dialogue box in a role-playing game can be considered an original image.

The "text" within the original image, in this context, pertains to any sequence of characters, symbols, or alphanumeric representations that convey written information within the virtual environment. This text can vary in font type, size, color, and orientation, reflecting the diverse design elements used in virtual experiences. For instance, text on a virtual billboard might be bold and colorful to attract attention, while text in a virtual book might be styled in a serif font for readability. The text may also vary with multiple different fonts, sizes, colors, or orientations within a single original image, or even within a single word within the image.

The "source language", in this context, denotes the natural language in which the text within the original image is written, which could be any human language such as English, Spanish, or German. In some embodiments, along with the original image, the system may also receive information about the target language into which the text is to be translated. This additional information is provided by the components within the virtual environment, which can determine the appropriate target language based on user preferences, location, or the virtual context. For example, a virtual tour guide application might send an image of a historical plaque in Italian and specify that the translation should be in English for the user.

In some embodiments, the system determines the target language based on a user profile of a user that participates in a virtual experience. In some embodiments, the user profile may include preferences and settings that indicate the preferred language of the user, which can be set during the initial setup of the user's account or adjusted at any time through the application's settings menu. In some embodiments, the system can additionally or alternatively determine the target language based on the user's geographical location, which can be identified through GPS data, IP address analysis, or other location-detection methods.

In some embodiments, the system may combine both user profile information and location data to make more accurate decisions regarding the target language. For instance, a user might prefer content in English but is currently located in France. The system could prioritize the user's language preference while also considering the location to offer additional translations or localized content as supplementary information. Block 202 may be followed by block 204.

At block 204, content of the text in the original image is recognized, and translated text is generated in a target language. In some embodiments, this process begins with text recognition, which involves identifying and extracting the text embedded within the original image. In some embodiments, optical character recognition (OCR) techniques are utilized, via an OCR model, to scan the image and convert the detected characters into machine-encoded text. In some embodiments, the OCR model takes into account various fonts, sizes, colors, and orientations of any text that may be present in the original image. For instance, the OCR may be configured to recognize the text of a bold, italicized headline on a virtual magazine cover or small, handwritten notes in a virtual diary.

In various embodiments, the OCR techniques are implemented using various algorithms and models, such as, e.g., template matching, feature extraction, and deep learning-based methods. Template matching involves comparing the image's text patterns against pre-defined templates to find matches, while feature extraction techniques detect edges, corners, and other text features to identify characters. Deep learning-based OCR methods, such as convolutional neural networks (CNNs) and recurrent neural networks (RNNs), provide more robust recognition by learning from large datasets of annotated text images. The input to the OCR model is the original image. In some embodiments, the original image is pre-processed to enhance text visibility prior to being used as input to the OCR model. The output to the OCR model is a string of machine-encoded text that accurately represents the recognized characters.

In some embodiments, the OCR model includes a pre-processing stage where the original image is enhanced to improve text recognition accuracy. This stage may involve, e.g., adjusting the image's brightness and contrast, applying filters to reduce noise, and using binarization techniques to distinguish text from the background. The OCR model then processes the enhanced image to detect and extract text regions, segment the text into individual characters or words, and apply recognition algorithms to convert the visual text into digital form. The output from the OCR model can then be further processed to correct errors, such as misrecognized characters, and to format the text for subsequent translation.

After recognizing the text content in the original image, the recognized text is translated into a target language. The target language can be obtained through various means, such as user preferences, location data, or specific instructions from components within the virtual environment. In some embodiments, a user's profile settings can be accessed that specify their preferred language, which is used as the target language. In some embodiments, the user's geolocation can be obtained to infer an appropriate target language for translation.

In some embodiments, the target language information is received directly from the components of the virtual environment that initially sent the original image. These components may include applications or services that determine the need for translation based on the user's interactions or the context within the virtual experience. By dynamically obtaining the target language, it can be ensured that translations are relevant and tailored to the user's current environment and preferences, thereby enhancing the overall user experience.

In some embodiments, translating the recognized text involves converting the machine-encoded text from the source language to the target language using one or more language translation models or algorithms. In some embodiments, this process is achieved through the use of neural machine translation (NMT) models, which leverage deep learning techniques to perform high-accuracy translations. In some embodiments, these models have transformer-based architectures, and are trained on large corpora of parallel text data, enabling them to learn the complex mappings between different languages. The input to the translation model is the recognized text in the source language, and the output is the translated text in the target language.

In some embodiments, after applying a translation algorithm to the content of the text to generate the translated text, the translated text is then rendered in a standard font.

In some embodiments, additional linguistic resources, such as, e.g., bilingual dictionaries, glossaries, and language-specific rules, are used to enhance the accuracy and fluency of the translated text. The translation model can incorporate these resources to resolve ambiguities and ensure that the translated text is contextually appropriate. For example, domain-specific terminology from the virtual environment can be included in the translation process to maintain consistency with the user's experience. In some embodiments, post-processing techniques, such as grammatical correction and context verification, may be employed to refine the translated text further.

In some embodiments, to handle various linguistic challenges, various techniques may be implemented for handling idiomatic expressions, colloquialisms, and other language-specific nuances. These techniques can involve context-aware translation methods that use surrounding text and situational context to translate phrases that do not have direct equivalents in the target language. In some embodiments, one or more translation models may be supported that are tailored to different types of content, such as, e.g., formal text, casual conversation, or technical documentation. Block 204 may be followed by block 206.

At block 206, a text region of the text is determined in the original image. A text region, in this context, refers to the specific area within the original image that contains the text. In some embodiments, image processing techniques are utilized to identify and delineate the text region. In some embodiments, edge detection algorithms, such as the Canny edge detector, are utilized to identify the boundaries of text characters based on changes in pixel intensity. Once the edges are detected, contour analysis can be used to group adjacent edges that likely form coherent text blocks.

In some embodiments, machine learning models, such as CNNs, are used to detect text regions. In some embodiments, these machine learning models are trained on large datasets of annotated images, learning to recognize patterns and features that distinguish text from non-text elements. In some embodiments, the trained models then analyze the original image, generating bounding boxes around detected text regions. The bounding boxes provide precise coordinates for the text regions, which can then be extracted for further processing.

In some embodiments, a combination of heuristic rules and probabilistic techniques are used to determine text regions. For example, rules may be implemented based on the typical locations of text in certain types of images, such as subtitles at the bottom of a video frame or titles at the top of a virtual game interface. Probabilistic methods, such as Markov Random Fields (MRFs), can further refine these regions by considering the spatial relationships between pixels and their likelihood of belonging to text.

In some embodiments, the text region is determined in the original image by first identifying text pixels of the original image that correspond to the content of the text; and second, generating a bounding box that includes all of the text pixels. In some embodiments, the identification of text pixels involves analyzing the image to detect regions where text is present, utilizing techniques such as edge detection, pattern recognition, and color analysis to distinguish text from other graphical elements. In some embodiments, this process involves scanning the image at multiple scales and orientations to accurately capture text that varies in size and angle. Block 206 may be followed by block 208.

At block 208, a style encoding is determined for the text in the original image. Style encoding refers to a mathematical representation that captures the visual characteristics of the text, such as, e.g., font type, size, color, weight (e.g., bold or italic), and other stylistic attributes. The style encoding is determined in order to preserve the original aesthetic and visual context of the text when translating it into the target language, ensuring that the translated text seamlessly integrates into the original image.

In some embodiments, the style encoding process begins with the extraction of visual features from the text region identified in block 206. These features can include, e.g., typographic properties such as the specific font family (e.g., Arial, Times New Roman), the size of the text, and any special styling such as bold or italicized formats. In some embodiments, the system uses deep learning techniques, such as the use of CNNs, to analyze the pixel data within the text region and generate a vector that encodes these visual features. This vector serves as the style encoding, capturing the visual attributes of the text.

For instance, if the original image contains a headline in bold, red, 24-point Helvetica font, the style encoding would include parameters representing the Helvetica font type, the bold weight, the red color, and the 24-point size. Similarly, if the text includes more complex styles, such as gradient fills or shadows, the encoding would incorporate these details, ensuring that the visual effects are retained in the translated text.

In other embodiments, a pre-trained style encoder may be used such as, a neural network specifically designed to distill the visual style of text into a compact vector representation. This encoder can be trained on a diverse dataset of text samples with various styles, allowing it to generalize and accurately capture the styles of new, unseen text. In some embodiments, the text region of the original image is provided as input to the style encoder. The style encoder then processes the text region and outputs the style encoding, which can then be used as an input to the diffusion model for generating the translated text.

In some embodiments, the style encoder has a bottleneck architecture, where the text region of the original image is distilled into a small vector that prevents memorization of the input text while retaining visual attributes of the text region. A bottleneck architecture involves compressing information through a narrow layer within a neural network, forcing the model to capture the most essential features while discarding redundant details. This compressed representation ensures that the encoder focuses on visual characteristics without overfitting to the specific details of the input text. In some embodiments, these visual attributes include, e.g., the color of the text, shape of the text, and combinations thereof. By reducing the text region to a small vector, the encoder captures the stylistic essence—such as, e.g., font style, stroke width, and embellishments—necessary for accurately reproducing the visual appearance of the text.

In some embodiments, the style encoding accounts for contextual elements, such as background color and texture, that influence the readability and aesthetics of the text. For example, if the text is overlaid on a textured background in the original image, the style encoding would capture the interaction between the text and the background, ensuring that the translated text remains legible and visually integrated. Block 208 may be followed by block 210.

At block 210, a masked version of the original image is generated. Masking, in this context, refers to the process of isolating the text region identified in block 206 into a bounding box and replacing the pixel values within that bounding box with a fixed value. This obscures the text while preserving the background and other elements of the image. In some embodiments, the masking process begins with generation of a binary mask that corresponds to the text region. This binary mask is a matrix of the same dimensions as the original image, where the pixels corresponding to the text region are assigned a value of 1 or another designated fixed value, and all other pixels are assigned a value of 0. In some embodiments, the binary mask is created using the bounding box or text region coordinates determined in block 206. Once the binary mask is generated, the system applies it to the original image by setting the pixel values in the text region to a predefined fixed value, such as black (RGB value [0,0,0]), white (RGB value [255,255,255]), or another neutral color.

For example, if the original image includes a section of text with colorful, patterned backgrounds, the masking process would involve identifying the exact pixels where the text resides and replacing those pixels with a uniform color. This approach "erases" the text without altering the surrounding image. The choice of the fixed value for masking can depend on the specific application and relevant visual effect; a neutral color like white or black is often used to provide a clear contrast for the subsequent placement of translated text.

In some embodiments, alpha masking or transparency masking may be utilized to preserve the background texture and color gradients. In alpha masking, the text region is set to a fixed alpha value, making it fully or partially transparent. Image processing algorithms may be utilized to blend the masked text region smoothly with the surrounding pixels to ensure a natural appearance.

In some embodiments, machine learning-based masking techniques may be implemented to enhance the accuracy and efficiency of the masking process. For example, CNNs trained on annotated datasets can predict the precise boundaries of the text region and generate masks that closely match the text contours. Block 210 may be followed by block 212.

At block 212, a noisy version of the original image is generated. A "noisy version" of the original image refers to an image where random noise has been added to the original pixel values. In various embodiments, this noise can be introduced to simulate various types of image degradation, such as graininess, blurring, or pixelation, which helps in training and enhancing the robustness of image processing models used in denoising and image reconstruction tasks.

In some embodiments, the noisy version is generated by applying Gaussian noise to the original image. Gaussian noise is a type of statistical noise with a probability density function equal to that of the normal distribution, which means it adds random values to each pixel based on a Gaussian distribution. In some embodiments, the amount of noise can be controlled by adjusting the standard deviation parameter of the Gaussian distribution. For example, a higher standard deviation results in more noticeable noise, while a lower standard deviation results in subtler noise. This technique allows creation of various levels of image degradation, from slightly noisy to heavily noisy versions. In some embodiments, to implement the addition of Gaussian noise, the original image is converted into a numerical array representing pixel intensity values. It then generates a noise matrix of the same dimensions, where each element is a random value drawn from a Gaussian distribution. This noise matrix is added element-wise to the original image array, resulting in the noisy version of the original image. It is ensured that the pixel values in the noisy image remain within valid bounds (e.g., 0 to 255 for 8-bit images) by clipping any values that exceed these limits.

In other embodiments, only a partially noisy version of the original image is generated rather than a fully noisy version. In a partially noisy version, noise is added selectively to certain regions of the image instead of uniformly across the entire image. This approach can be useful for focusing on specific areas that require noise for training or testing purposes while preserving the quality of other regions. For instance, noise might be applied only to the background areas while keeping the text region clear, or vice versa, depending on the intended application. In some embodiments, to achieve a partially noisy version, a mask is used to specify which regions of the original image should be affected by the noise. This mask can be generated based on various criteria, such as the location of text regions, areas of interest, or randomly selected portions of the image. The noise matrix is then applied only to the masked regions, leaving the unmasked areas unchanged. This selective application of noise helps in creating more targeted and realistic scenarios for image processing tasks, enhancing the overall effectiveness of the technique. Block 212 may be followed by block 214.

At block 214, the noisy version of the original image, the masked version of the original image, and the text region is provided as direct inputs to a pre-trained diffusion model. A pre-trained diffusion model, in this context, is a type of deep learning model that has been trained on a large dataset to learn how to progressively denoise images. These models are often utilized at generating or restoring images by iteratively refining noisy inputs through a process that models the diffusion of information across the image. A diffusion model operates by taking an initial noisy image and gradually refining it through multiple iterations. Each iteration reduces the noise and brings the image closer to its original, noise-free state. The model learns to reverse the process of adding noise, and reconstructing the original image from its noisy counterpart. This learning is achieved through extensive training on large datasets, where the model is exposed to numerous examples of noisy and clean images, enabling it to learn the underlying patterns and structures of the images. In some embodiments, the term "pre-trained diffusion model" as used herein may additionally be used to refer to a model that was initialized as a pre-trained model, and then was subsequently fine-tuned on a dataset.

In the context of this technique, the noisy version of the original image, the masked version of the original image, and the text region are provided as inputs to the diffusion model. The noisy version helps the model understand the extent and type of noise present, while the masked version indicates which areas of the image have been intentionally obscured and need reconstruction. The text region provides the specific area of interest where the text is located, allowing the model to focus its reconstruction efforts on this critical part of the image. Together, these inputs enable the diffusion model to denoise and reconstruct the image while preserving the features and structure of the text region.

The diffusion model denoises the noisy image, so having the noisy image as a direct input ensures that the denoising results in an image that is visually similar to the original image. The masked image being used as a direct input ensures that the denoising process is weighted towards pixel values that match those of the original image for the non-text region of the original image. The text region being used as a direct input indicates a region to be inpainted during the diffusion process. Inpainting refers to the technique of reconstructing lost or deteriorated parts of an image. In this context, it involves filling in the text region with new pixel values that correspond to the translated text, while blending with the surrounding pixels to maintain visual coherence. By identifying the text region as an area for inpainting, the diffusion model can focus its generative capabilities on this specific part of the image, ensuring that the new text is integrated naturally.

In some embodiments, the process of providing these inputs to the diffusion model involves converting the images and regions into suitable formats that the model can process. In some embodiments, the system ensures that all inputs are appropriately scaled and aligned to maintain consistency across the different data types. Once the inputs are prepared, they are fed into the diffusion model, which then begins its iterative denoising and reconstruction process.

In some embodiments, providing the text region to the pre-trained diffusion model includes providing the bounding box as input to the diffusion model as well. Providing the bounding box aids with rendering of shorter or longer text translations than the original text. It effectively ensures that the translation fits within the text region. The bounding box serves as a spatial guide for the model, delineating the exact area where the translated text should be placed, thereby preserving the layout and avoiding overlap with other visual elements. By defining the text region with a bounding box, the model can dynamically adjust the font size, spacing, and alignment of the translated text to maintain readability and aesthetic consistency within the given space.

In some embodiments, the direct inputs are part of an encoding and decoding process of the pre-trained diffusion model. The encoding and decoding process in a diffusion model involves transforming the input data through multiple layers to extract meaningful features and then reconstructing the data into a refined output. During the encoding phase, the model processes the direct inputs to extract high-level features that capture the essential aspects of the image. In some embodiments, this involves multiple layers of convolutions and transformations that gradually distill the input data into a compact representation. In the decoding phase, the model uses the extracted features from the encoding phase to reconstruct the image iteratively, refining it at each step to reduce noise and enhance details. In some embodiments, the encoding process only happens once per input. The diffusion model then produces encoded outputs for each input. Those encoded outputs must eventually be decoded to produce the final refined image. This ensures that the computationally intensive encoding process is only performed once, while the decoding process, which can be more efficient, can be repeated as necessary to achieve the desired quality and resolution in the output images. Block 214 may be followed by block 216.

At block 216, the translated text and the style encoding is provided as conditioning inputs to the pre-trained diffusion model. Conditioning inputs are supplementary data provided to a model to guide and refine its output, ensuring that the generated results align with specific requirements or characteristics. In this context, the translated text and the style encoding serve as conditioning inputs to steer the diffusion model towards generating an image that contains the translated text and also preserves the visual style of the original text.

The translated text is the output of the text recognition and translation processes described in earlier steps. This text represents the original content in the source language, translated into the target language. By providing this translated text as a conditioning input, the diffusion model is informed about the exact textual content that needs to be incorporated into the final output image. The translated text guides the inpainting during diffusion to include pixels that correspond to the transition. Specifically, the translated text ensures that the newly generated text pixels align correctly with the intended translated content. In some embodiments, the rendered text enables the diffusion process to generalize to unseen characters, symbols, or alphanumeric representations. This means that the model can adapt to and render text elements it has not encountered during training. In some embodiments, the character-level encoding reduces hallucinations. Hallucinations in the context of generative models refer to the generation of content that is not present in the original input data, often resulting in nonsensical or irrelevant information. By encoding text at the character level, the system ensures a more granular and precise representation of the text content. Each character is encoded individually, maintaining its distinct identity and attributes, which allows the model to more accurately reconstruct the text during the inpainting process.

The style encoding encapsulates the visual attributes of the original text, such as, e.g., font type, size, color, alignment, and other stylistic elements. This encoding is a mathematical representation that the diffusion model uses to replicate the appearance of the text in the output image. The style encoding guides the inpainting-via-diffusion to retain visual attributes, such as, e.g., color and shape, of the characters of the text in the original image, while not conveying sufficient information to reproduce the input text itself.

In some embodiments, in order to implement these conditioning inputs, the translated text and style encoding is processed and formatted into forms that the diffusion model can utilize. In some embodiments, the translated text is converted into a standardized textual format. In some embodiments, the style encoding is represented as a vector or set of parameters that describe the visual characteristics of the text. These formatted inputs are fed into the diffusion model along with the other direct inputs (i.e., the noisy version of the original image, the masked version of the original image, and the text region) to influence the image generation process.

In some embodiments, a prompt is provided as an additional conditioning input to the pre-trained diffusion model, where the prompt is a command to write the translated text in the output image. This prompt serves as a directive that explicitly instructs the diffusion model to incorporate the translated text into the designated text region of the image. The prompt can be formulated in a natural language or a structured format, specifying details such as the exact placement, alignment, and orientation of the text. By including this prompt, the system ensures that the model not only generates text with the correct content, but also positions it accurately within the image context. In some embodiments, the prompt can additionally include stylistic or formatting instructions that guide the model in rendering the text with the relevant visual attributes.

In some embodiments, the conditioning inputs are provided as respective conditioning vectors to the pre-trained diffusion model. Cross-attention vectors are computed individually. The contribution of the cross-attention vectors is summed through residual layers of the pre-trained diffusion model. In some embodiments, every new conditioning vector has individual keys and values that are learned during training. The keys and values enable the model to effectively interpret and utilize the additional contextual information provided by each conditioning input. In some embodiments, the encoder/decoder model, which may be implemented as a U-Net architecture, generates translated images using a unique set of query vectors for all of the conditioning inputs. For each conditioning input, such as the translated text or style encoding, the model generates specific query vectors to interact with the corresponding keys and values. The interaction facilitates the computation of cross-attention vectors, which represent the relevant parts of the input data needed for accurate image generation.

In some embodiments, cross-attention vectors are computed individually for each conditioning input. By treating each conditioning vector separately, the model can be used to determine the importance of the translated text, style encoding, and other inputs, leading to more precise and contextually relevant outputs. This process helps in isolating the contributions of each conditioning input, preventing any single input from disproportionately influencing the output. In some embodiments, for each image input and each of the four conditioning inputs, key and value vectors are computed through a linear mapping of the encoded inputs to an embedding space. This linear mapping is learned through a fine-tuning process to enable the model to adapt to various types of conditioning information.

In some embodiments, from the input image, query vectors are also computed for each intermediate representation of the U-Net module. In some embodiments, these query vectors are learned linear mappings. In some embodiments, the process of computing cross-attention involves using a machine learning attention formula, which calculates the relevance of different parts of the input data based on the keys, values, and queries. The attention outputs derived from this calculation are then added to the U-Net's intermediate representations.

In some embodiments, the contribution of the cross-attention vectors is then summed through residual layers, which play a crucial role in maintaining the stability and robustness of the model. Residual layers allow the model to integrate multiple conditioning inputs smoothly, even if some of them are noisy or irrelevant. The summing process ensures that the final output reflects a balanced combination of all relevant information. Block 216 may be followed by block 218.

At block 218, an output image is obtained that includes the translated text. The pre-trained diffusion model generates an image incorporating the translated text while preserving the visual style of the original text. The diffusion model, after processing the various inputs including the noisy version of the original image, the masked version of the original image, the text region, the translated text, and the style encoding, iteratively refines the noisy image to generate the final output. This iterative refinement process, inherent to diffusion models, allows the system to progressively denoise the image, incorporating the conditioning inputs to ensure the translated text is correctly rendered in the appropriate visual style.

In various embodiments, the output image is verified to ensure that it closely resembles the original image in terms of visual attributes, with the only difference being the language of the text. The verification can involve comparing the output image to the original image using metrics such as, e.g., structural similarity index (SSI) or other image comparison techniques to ensure that the translated text is integrated without distorting the visual elements of the image.

In some embodiments, one or more quality scores are obtained to evaluate the output image for quality and effectiveness. These scores may help in a determination of whether the translated text is legible as well as stylistically coherent with the original image.

In some embodiments, one of the computed quality scores assesses the readability of the translated text in the output image. To compute this quality score, OCR techniques are utilized which scan the output image and extract the textual content. Once the text is extracted, the normalized edit distance between the text intended to be inpainted and the extracted text is computed. In some embodiments, the normalized edit distance measures the similarity between the two texts, with a score ranging from 0 to 1, where 1 indicates perfect legibility. The readability score is calculated as one minus the normalized edit distance, ensuring that a score of 1 reflects perfect legibility. Any output image with a readability score lower than 0.95 is considered unreadable and is discarded, ensuring that only images with high legibility are retained.

In some embodiments, one of the computed quality scores assesses the aesthetic consistency of the output image in relation to the original image. This score evaluates whether the translated text maintains the visual style of the original text, including, e.g., colors, fonts, and background elements. In some embodiments, to measure aesthetic consistency, the Learned Perceptual Image Patch Similarity (LPIPS) metric or a similar metric is used. The LPIPS metric compares the visual similarity between patches of the input and output images, producing a score that ranges from 0 to 1, where 1 indicates perfect stylistic similarity. The aesthetic consistency score is calculated as one minus the LPIPS value. Images with an aesthetic consistency score below 0.8 are discarded, ensuring that only those images that closely match the original style are kept.

In some embodiments, after the output image is obtained, it is then prepared for its intended use. In some embodiments, this could involve one or more of: rendering the output image within a virtual environment, displaying it in a user interface, and storing it for future use. In some embodiments, the system renders a virtual experience that includes the output image.

Figure 3:
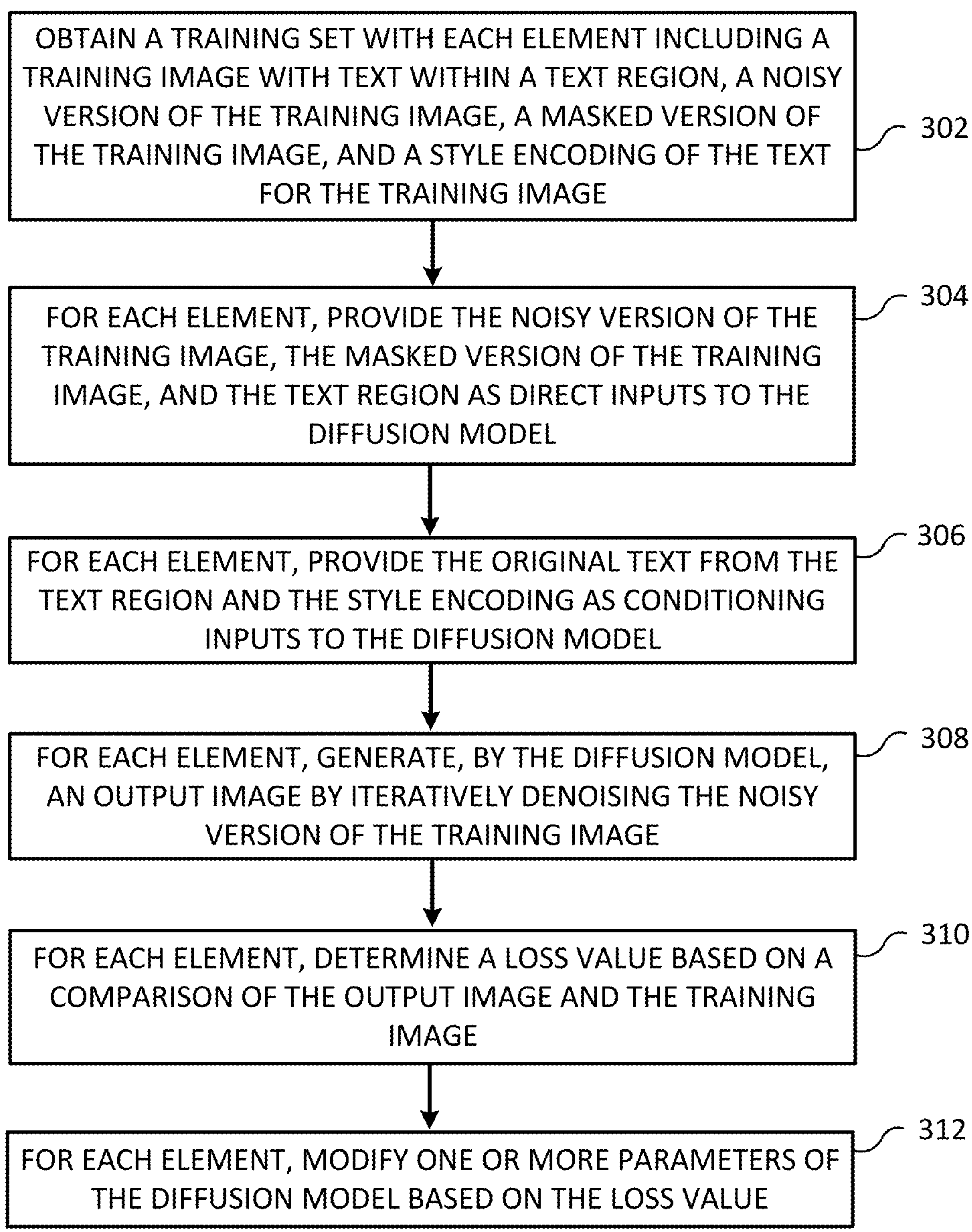
FIG. 3 is a flow diagram illustrating a method of training a diffusion model to provide image text translation with style matching, in accordance with some implementations.

FIG. 3 illustrates a method of training a diffusion model to generate images, in accordance with some implementations. In various embodiments, the blocks shown in FIG. 3 and described below may be performed by any of the elements illustrated in FIG. 1.

At block 302, a training set with each element including a training image with text within a text region, a noisy version of the training image, a masked version of the training image, and a style encoding of the text for the training image is obtained. The training set forms the foundational data that the diffusion model will use to learn how to generate output images with accurate text translations while preserving the style and visual characteristics of the text.

The training image of each training set element includes the original visual content along with text embedded in a specific text region. In various embodiments, this text can vary in terms of font, size, color, and orientation, representing a wide range of real-world examples. The inclusion of diverse text styles and contexts in the training images helps the model generalize better and perform well on a variety of input images during inference. The training images might include, for example, text on signs, posters, advertisements, and other graphic elements commonly found in virtual environments.

In some embodiments, the training images include game icons from a virtual environment platform that hosts a plurality of games, each with a respective game icon. These game icons can serve as a diverse and rich source of training data, reflecting a wide array of visual styles, text formats, and contextual information. In some embodiments, the game icons may contain, for example, critical branding elements, titles, and other textual information that can vary significantly between different games.

In some embodiments, the game icons each include at least one alphanumeric character, and the text region in respective game icons is in a respective language. Alphanumeric characters in game icons may include, for example, game titles, player information, and other descriptive text. The characters can vary widely in style and presentation, providing a rich dataset for training. Block 302 may be followed by block 304.

At block 304, for each element, the noisy version of the training image, the masked version of the training image, and the text region as direct inputs to the diffusion model, are provided. The direct inputs guide the diffusion model through the training process to effectively denoise and reconstruct the text region in a manner consistent with an image's style and content. The noisy version of the training image is used to influence the diffusion model to identify and reduce this noise through iterative denoising processes, gradually refining the image to restore its original clarity. The masked version of the training image is used to indicate the text region that needs to be reconstructed. By setting the text region's pixel values to a fixed value (such as, e.g., black or white), the area, where inpainting needs to occur, is defined. This helps the diffusion model focus its efforts on reconstructing the text region accurately, using the surrounding context to guide the inpainting process. The text region itself is provided as a direct input to indicate precisely where the text is located within the image. Block 304 may be followed by block 306.

At block 306, for each element, the original text from the text region and the style encoding are provided as conditioning inputs to the diffusion model. The conditioning inputs arc used to guide the model to accurately recreate the text in the translated image while preserving the original visual style. The original text from the text region is used to ensure that the content being generated in the output image matches the intended translation. This input helps the model understand the specific characters and words that need to be rendered, providing a precise reference for text generation. The style encoding is used as a conditioning input to capture the visual attributes of the text in the original image. This includes aspects such as, for example, font type, size, color, and other stylistic elements that define the text's appearance. In some embodiments, the style encoding is represented as a compact vector that encodes these attributes in a form that the model can utilize. Block 306 may be followed by block 308.

At block 308, for each element, an output image is generated by the diffusion model, by iteratively denoising the noisy version of the training image. In some embodiments, the iterative denoising process begins with the noisy version of the training image as the initial input. The diffusion model processes this noisy image through multiple layers, each designed to progressively reduce the noise and refine the image. At each iteration, the model applies learned transformations that adjust pixel values, gradually restoring the original features and details of the image while maintaining the overall structure. This iterative reduction of noise allows the model to focus on both global and local features, ensuring a comprehensive and accurate reconstruction.

In some embodiments, throughout the denoising iterations, the model leverages the direct inputs and conditioning inputs provided in earlier steps. The noisy and masked versions of the image, along with the text region, guide the model in identifying areas that need attention and accurately reconstructing the text. The original text and style encoding as conditioning inputs ensure that the text generated in the output image matches the intended content and visual style. The inputs are crucial for maintaining consistency and fidelity, allowing the model to generate an image that closely resembles the original in both appearance and content.

In some embodiments, each iteration in the denoising process involves computations, where the model predicts and corrects pixel values based on the inputs and the learned noise patterns. The process continues until the model reaches a point where further iterations yield minimal changes, indicating that the image has been sufficiently denoised. The final output image is expected to be free of noise and to include the translated text rendered in the style of the original text. Block 308 may be followed by block 310.

At block 310, for each element, a loss value based on a comparison of the output image and the training image is determined. The loss value quantifies the difference between the generated output image and the original training image, serving as a critical metric for evaluating the performance of the diffusion model. In some embodiments, the loss value is the mean-squared difference between an encoded input image and an output image encoding, where the encoder may be a pre-trained variational autoencoder. To determine the loss value, various loss functions are employed that measure discrepancies in different aspects of the images. In some embodiments, the pixel-wise loss functions, such as mean squared error (MSE), is used to calculate the average squared difference between corresponding pixel values in the output and training images. In some embodiments, perceptual loss functions is used, that leverage pre-trained neural networks to compare features extracted from intermediate layers, focusing on structural and semantic similarities between the images.

In some embodiments, style loss components are used. These components compare the style encoding of the text in the output image with the original style encoding provided as a conditioning input. By doing so, the generated text matches the content of the original text and also preserves its visual style, including, e.g., font, color, and other stylistic attributes. Block 310 may be followed by block 312.

At block 312, for each element, one or more parameters of the diffusion model are modified based on the loss value. This improves the performance of the model over time by minimizing the discrepancy between the generated output images and the original training images.

In various embodiments, optimization algorithms such as stochastic gradient descent (SGD) or its variants like Adam are utilized to modify the model's parameters. These algorithms adjust the parameters by calculating the gradients of the loss function with respect to each parameter. The gradients indicate the direction and magnitude of the adjustments needed to reduce the loss value.

In the context of a diffusion model, the parameters include weights and biases within the various layers of the neural network. The layers process the input images through encoding and decoding stages, iteratively refining the image. By adjusting the weights and biases, each layer can be fine-tuned to respond to the input data, improving the model's ability to denoise the image and accurately render the translated text. This continuous adjustment process helps the model learn the complex relationships between the noisy inputs, masked regions, and conditioning inputs, leading to better overall performance.

Figure 4:
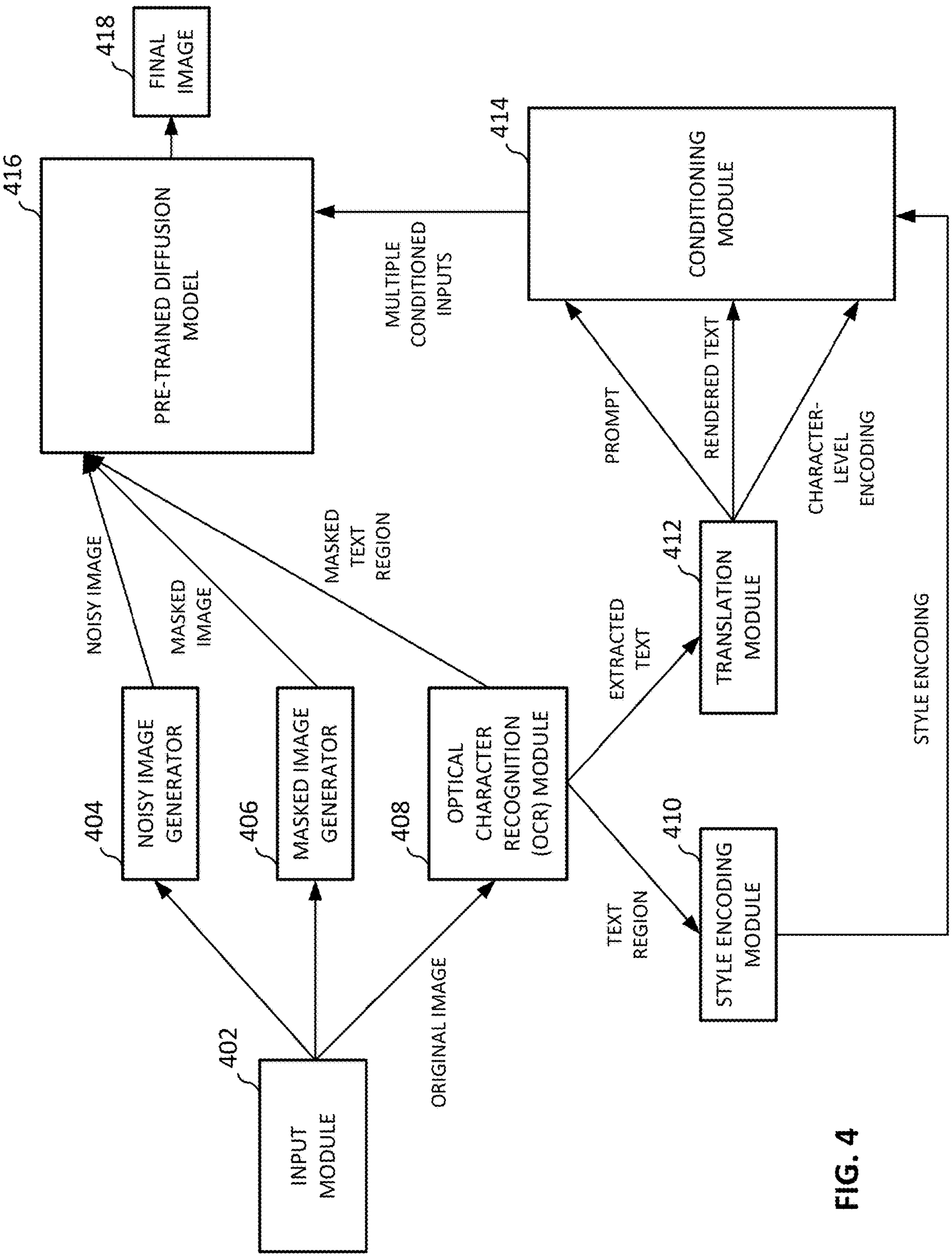
FIG. 4 is a flow diagram illustrating an example workflow applying a pre-trained diffusion model to generate images that include translated text while preserving the visual style of the original text, in accordance with some implementations.

FIG. 4 illustrates an example workflow for applying a pre-trained diffusion model to generate images that include translated text while preserving the visual style of the original text, in accordance with some implementations.

First, an input module 402 receives an original image containing text in a source language. This image is the starting point for the process, and serves as the base image from which various inputs for the diffusion model will be derived. The input module sends the original image on to a noisy image generator 404, a masked image generator 406, and an OCR module 408.

The noisy image generator 404 receives the original image passed in as input from the input module 402 and generates a noisy version of it, which is passed as input to a pre-trained diffusion model 416. The masked image generator 406 also processes the original image from the input module, and generates a masked version of the image by setting the pixel values in the text region to a fixed value, such as black or white, thereby obscuring the text. This masked version of the image is passed on as input to the pre-trained diffusion model 416. The OCR module 408 uses one or more OCR techniques to identify and extract text from the original image. It determines the text region and extracts the text content. The text region is then used to generate a masked text region which is passed on to the pre-trained diffusion model 416 as a direct input. The OCR module 408 also passes on the location of the text region to a style encoding module 410, and passes on the extracted text content to a translation module 412.

The style encoding module 410 takes the text region identified by the OCR module 408 and generates a style encoding. This encoding is a mathematical representation of the visual style of the text, including attributes such as font, color, and size. The style encoding ensures that the translated text will maintain the same visual style as the original text. The style encoding is passed on as input to a conditioning module 414.

The translation module 412 receives the extracted text and translates it into the target language. The translated text is then rendered in a standard font on a white background, which helps the diffusion model generalize to new characters and symbols. The translated text in prompt format (i.e., a command to write the translated text), rendered text, and character-level encoding are sent to the conditioning module 414 for further processing.

The conditioning module 414 prepares multiple conditioning inputs for the diffusion model. These inputs include the prompt, the rendered text, the character-level encoding (to reduce hallucinations and ensure accuracy), and the style encoding. The conditioning module ensures that these inputs are formatted correctly and ready for integration into the diffusion model. The conditioning module 414 then passes these multiple conditioned inputs to the pre-trained diffusion model 416 as conditioned inputs.

The pre-trained diffusion model 416 receives the noisy image, masked image, masked text region as direct inputs, and multiple conditioned inputs from the conditioning module 414. The diffusion model 416 uses these inputs to iteratively denoise and reconstruct the image, generating a final output image 418 that includes the translated text. The final image 418 retains the visual style of the original text and maintains a high level of fidelity to the original image.

Figure 5A:
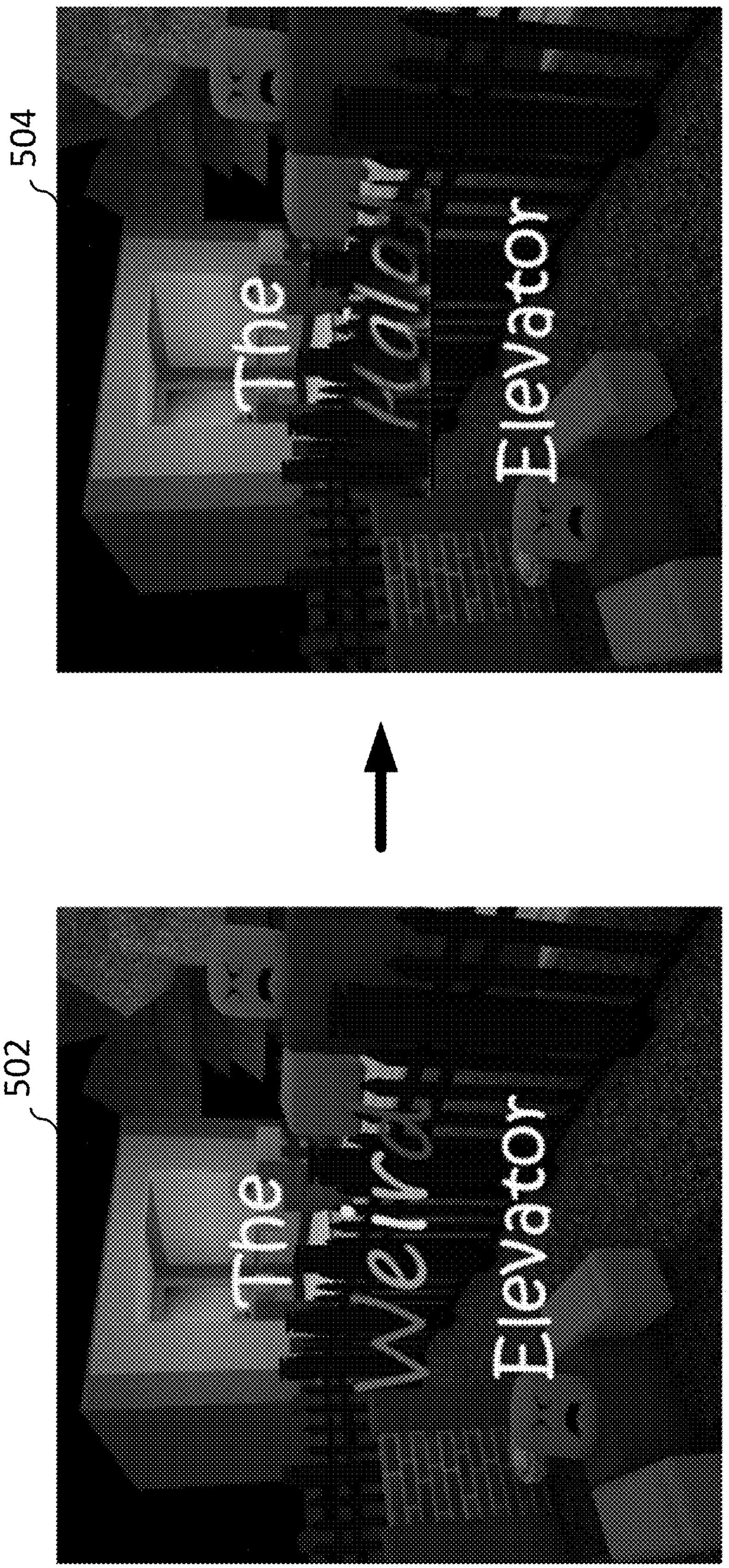
FIG. 5A is a diagram illustrating an example of a failure outcome when attempting to use an existing prior art approach, in accordance with some implementations.

FIG. 5A depicts a failure outcome when attempting to use an existing prior art Generative Adversarial Network (GAN)-based approach, such as SRNet or MOSTEL, to generate an output image with translated text that preserves the style of the original text. The figure includes two images: the original image 502, and the output image 504. The original image 502 depicts a scene from a virtual environment, specifically a game. The text "The Weird Elevator" is prominently displayed in the scene. The text exhibits a varied style, with "Weird" rendered in a gradient. The output image 504 represents the result of applying a GAN-based approach to translate the text while attempting to preserve its original style. In this case, the text "Weird" was translated to "Hola", which is an incorrect translation that does not fit any target language. In addition, the translated "Hola" did not maintain the visual fidelity and stylistic consistency of the original text "Weird", and introduces blurriness and artifacts, including unintended distortions, within the text region. Furthermore, "The" and "Elevator" are left untranslated. Finally, the text appears misaligned and fails to blend naturally with the background, indicating a lack of contextual understanding by the GAN-based model.

The depicted failure state in FIG. 5A highlights some inherent limitations of GAN-based approaches like SRNet or MOSTEL when applied to the task of text translation in images. First, GAN-based models often face challenges in preserving complex text styles, particularly when dealing with intricate visual attributes such as color gradients and custom fonts. Second, GANs can introduce artifacts during the image generation process, especially in scenarios requiring precise text inpainting. Third, GAN-based models may lack the capability to fully understand and integrate the context of the text within the broader scene. This limitation can result in translations that appear out of place or misaligned with the surrounding visual elements.

Figure 5B:
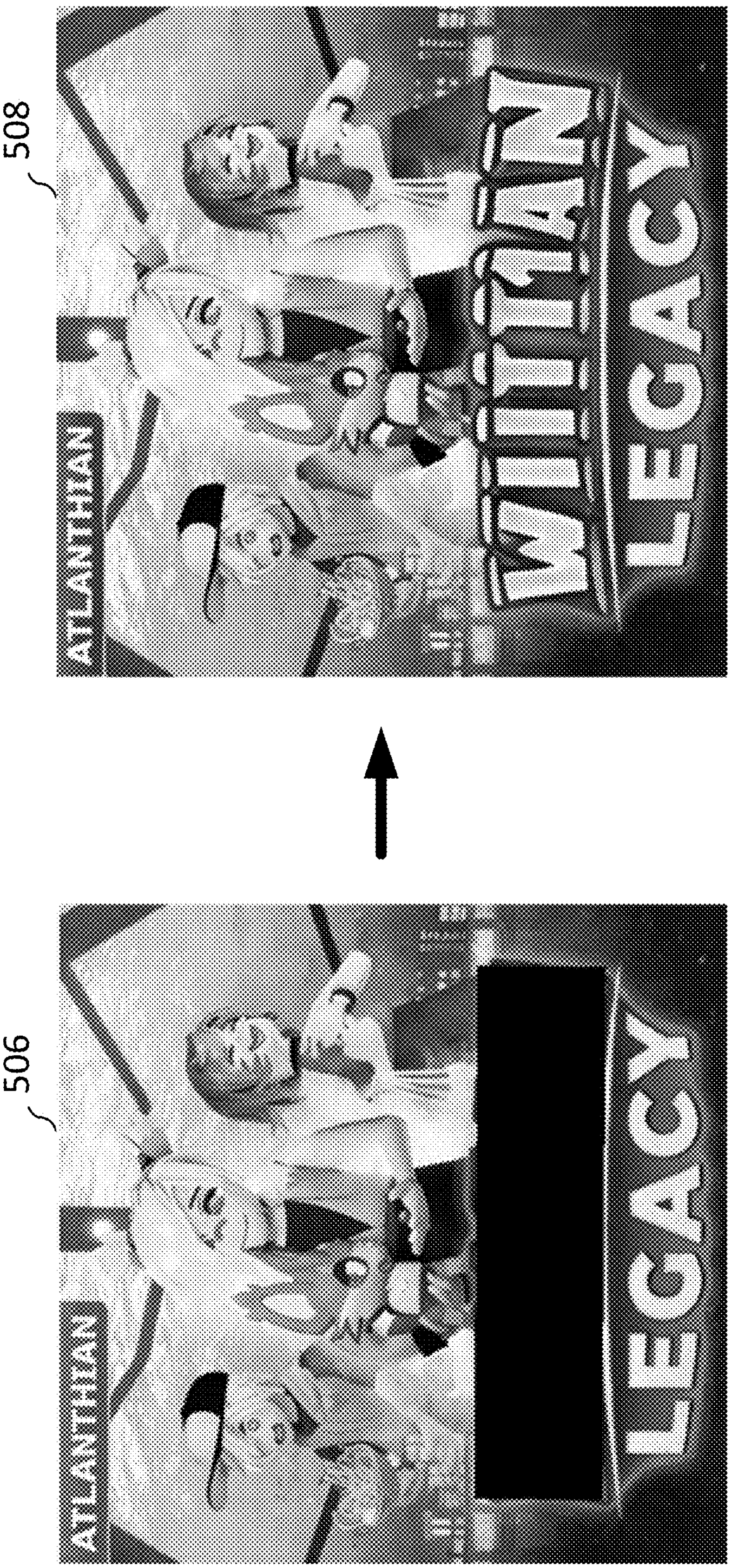
FIG. 5B is a diagram illustrating an example of a failure outcome when attempting to use an existing prior art approach, in accordance with some implementations.

FIG. 5B illustrates a failure outcome when attempting to use an off-the-shelf diffusion inpainting model, specifically Stable Diffusion XL inpainting, to generate a final image. The objective was to translate and render text accurately within an image while preserving its original style. In this instance, the model was prompted to write "Loomian" within the text region, but failed to correctly depict this word in the output image. The figure includes two images: the original image 506 with a masked text region, and the output image 508 with the generated text.

The original image 506 depicts a title image or thumbnail related to a game experience. The text region intended for translation has been masked, rendering it black to obscure the original content. The remaining elements of the image, including characters and background, remain intact to provide context for the text integration. The output image 508 represents the result after applying the Stable Diffusion XL inpainting model with the prompt "write 'Loomian'." The expected outcome was to see the word "Loomian" rendered in a style consistent with the original design and context. However, the model instead produced text that may read as "WIITIAN" or similar, which deviates significantly from the intended translation. This failed outcome includes incorrect text generation, style inconsistency, and issues with the placement and integration of the generation text within the image, with misalignment of the text with the surrounding visual elements. This creates artifacts within the text region.

Figure 5C:
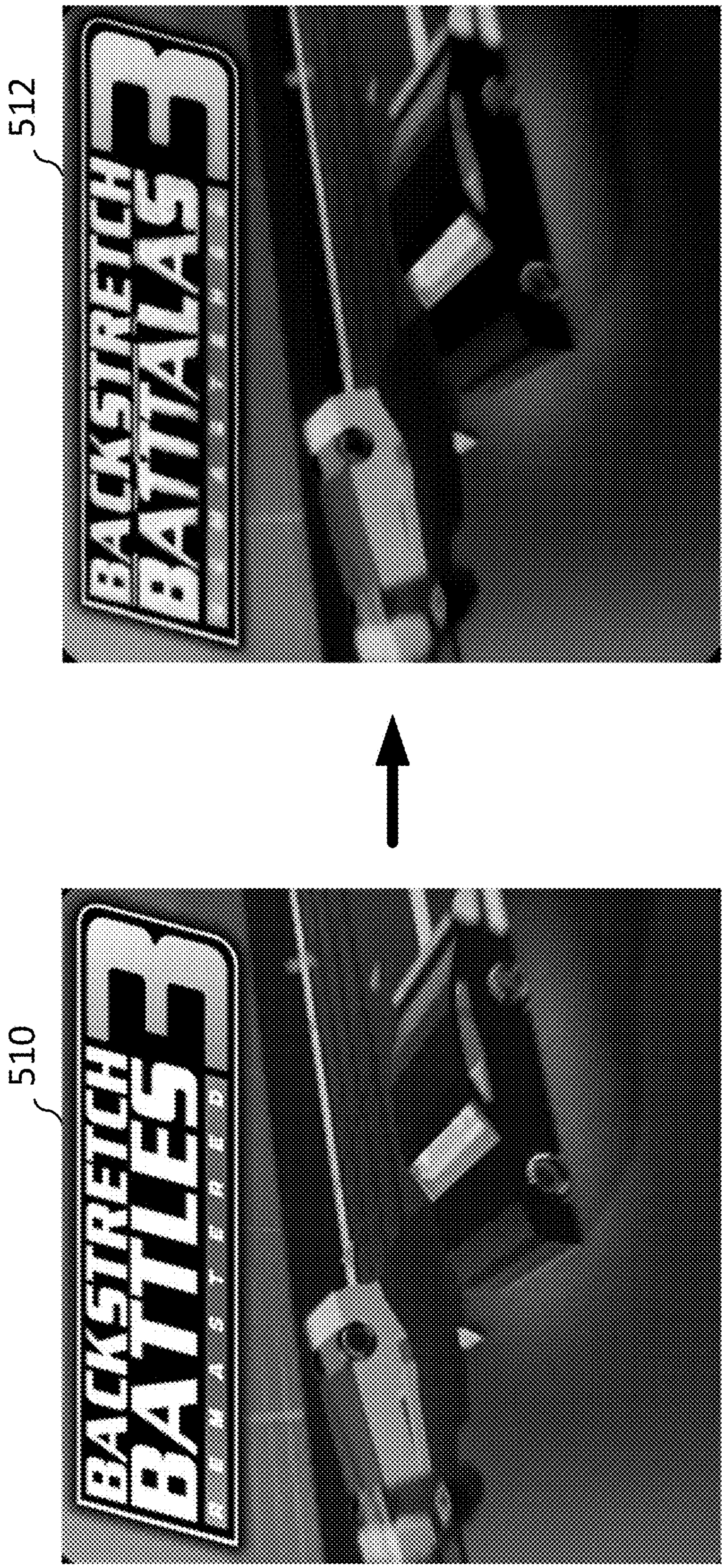
FIG. 5C is a diagram illustrating an example of a failure outcome when attempting to use an existing prior art approach, in accordance with some implementations.

FIG. 5C illustrates a failure outcome when an off-the-shelf diffusion model attempts to generate translated text within an image but produces hallucinations, resulting in inaccurate and misleading text. The figure includes two images: an original image 510 and an output image 512.

The original image 510 is a graphical representation from a virtual game environment, specifically featuring the title "BACKSTRETCH BATTLES 3 REMASTERED." The text is clearly displayed at the top of the image, with the word "BACKSTRETCH" in white, "BATTLES" in white, and "REMASTERED" in red, all set against a black background with a gradient effect and bold typography. The output image 512 is the result after applying a diffusion model to translate and render the text. However, instead of accurately reproducing the text "BACKSTRETCH BATTLES 3 REMASTERED," the model generates the text "BACKSTRETCH BATTALAS 3 REMASTERED" with visible hallucinations in the generated text "BATTALAS". In this failure state, an off-the-shelf diffusion model has generated text that does not correspond to any meaningful or correct translation, suggesting a hallucination where the model produces plausible but incorrect text. Techniques such as custom pre-trained diffusion models, designed specifically for text translation and rendering, aim to address these issues by providing more accurate text generation, reducing hallucinations, and maintaining visual coherence.

Figure 5D:
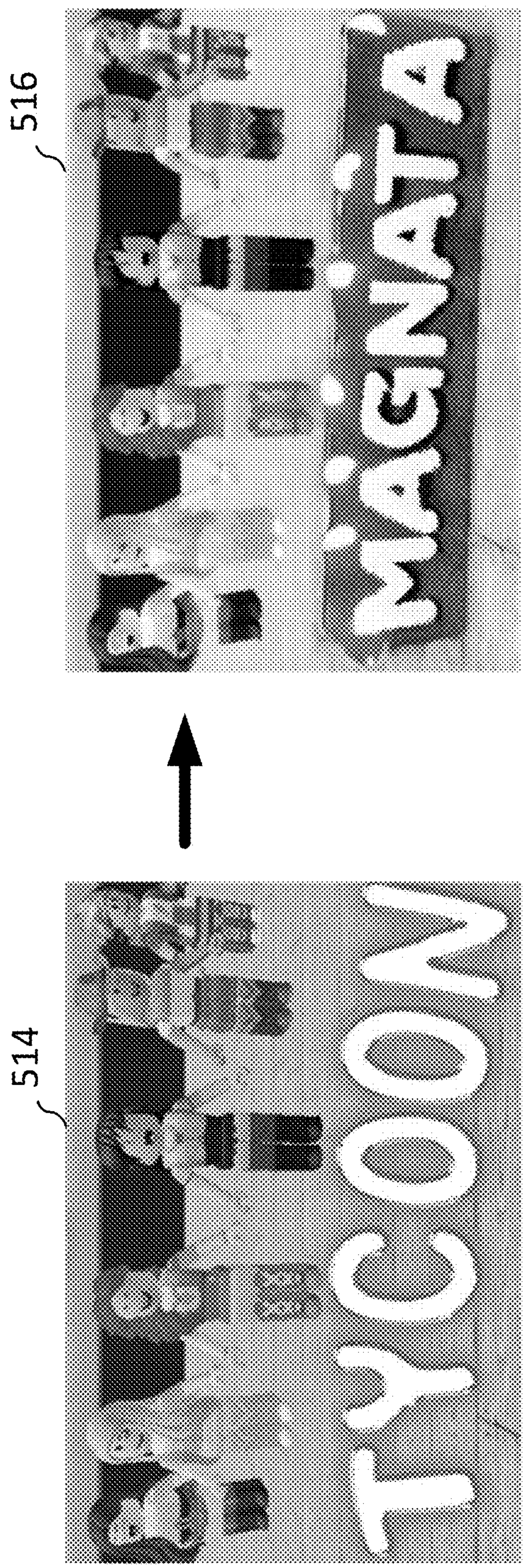
FIG. 5D is a diagram illustrating an example of a failure outcome when attempting to use an existing prior art approach, in accordance with some implementations.

FIG. 5D illustrates a failure outcome where the generated output image exhibits poor style consistency due to the absence of a style encoding used as a conditioning input to the diffusion model. The figure includes two images: the original image 514 and the output image 516. The original image 514 is a promotional graphic for a game. The text "TYCOON" is prominently displayed at the bottom of the image in a bold, neon pink style with a glowing effect. The output image 516 represents the result after applying a diffusion model to translate and render the text. The intended translation was to replace "TYCOON" with "MAGNATA" (the Portuguese word for "tycoon"). The translation to "MAGNATA" is a correct translation. However, the resulting text "MAGNATA" does not maintain the original style, appearing inconsistent with the intended neon pink glow and bold font. This suggests that the visual style was not properly preserved.

The depicted failure in FIG. 5D underscores the importance of using a style encoding as a conditioning input in the diffusion model. Without style encoding, the model lacks the necessary information to accurately replicate visual characteristics of the text, resulting in stylistic inconsistencies.

Figure 6A:
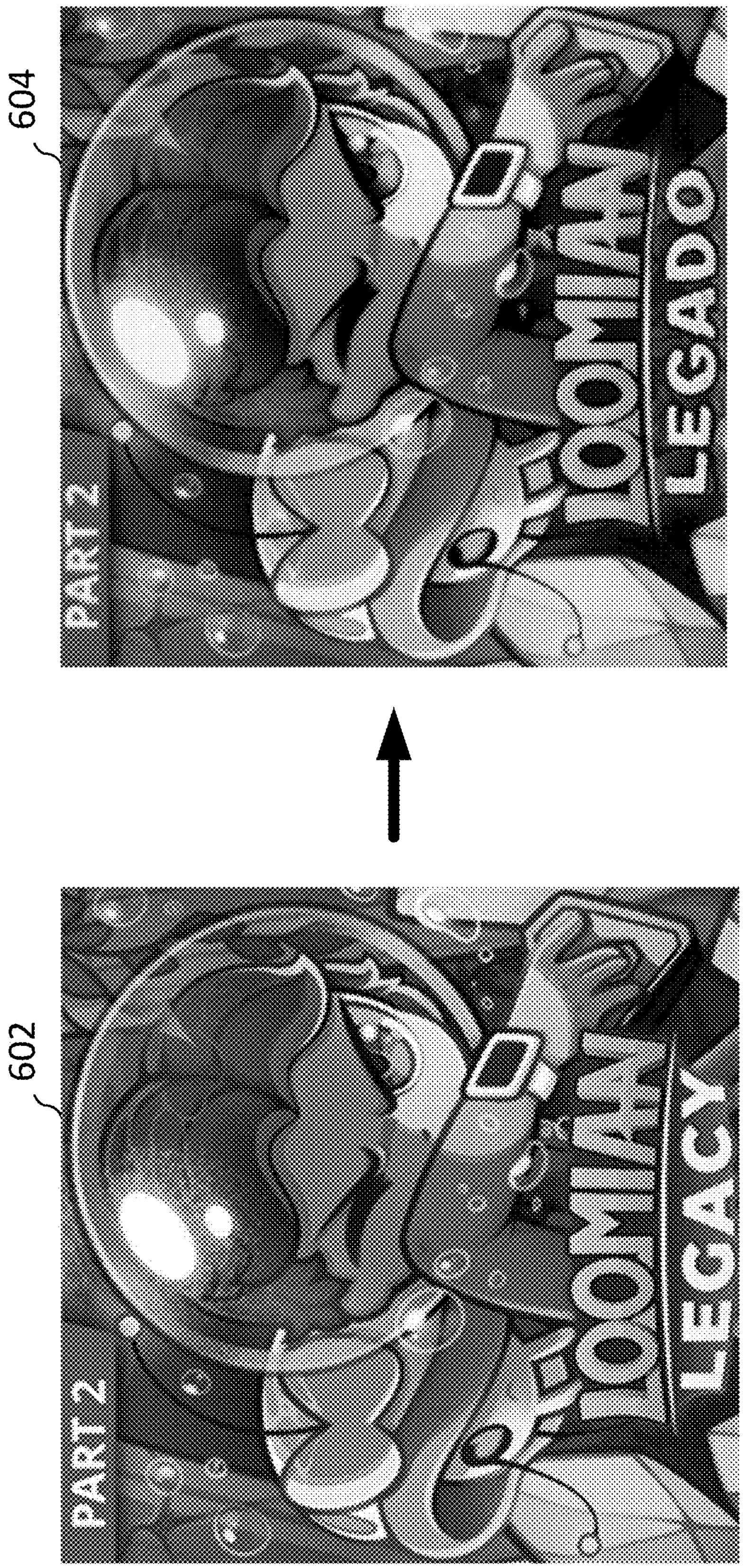
FIG. 6A is a diagram illustrating an example of a successful outcome of applying the described systems and methods for translating text within an image while preserving the original style, in accordance with some implementations.

FIG. 6A illustrates a successful outcome of applying the described systems and methods for translating text within an image while preserving the original style. The figure includes two images: the original image 602 and the output image 604.

The original image 602 is a promotional graphic for a game titled "LOOMIAN LEGACY." The text "LOOMIAN" is displayed prominently in yellow with a stylized font, and the word "LEGACY" is shown in a bold white font with a gradient effect, both integrated seamlessly into the overall design.

The output image 604 represents the result after applying the pre-trained diffusion model and the described methods to translate the text. The original text "LEGACY" has been accurately translated to "LEGADO," the Portuguese word for "legacy," while preserving the original style and visual attributes. The translated text integrates seamlessly with the rest of the image, maintaining the same font, color, and stylistic effects as the original. This successful outcome includes accurate text translation, style consistency, and integration of the translated text into the image without visible artifacts or distortions.

Figure 6B:
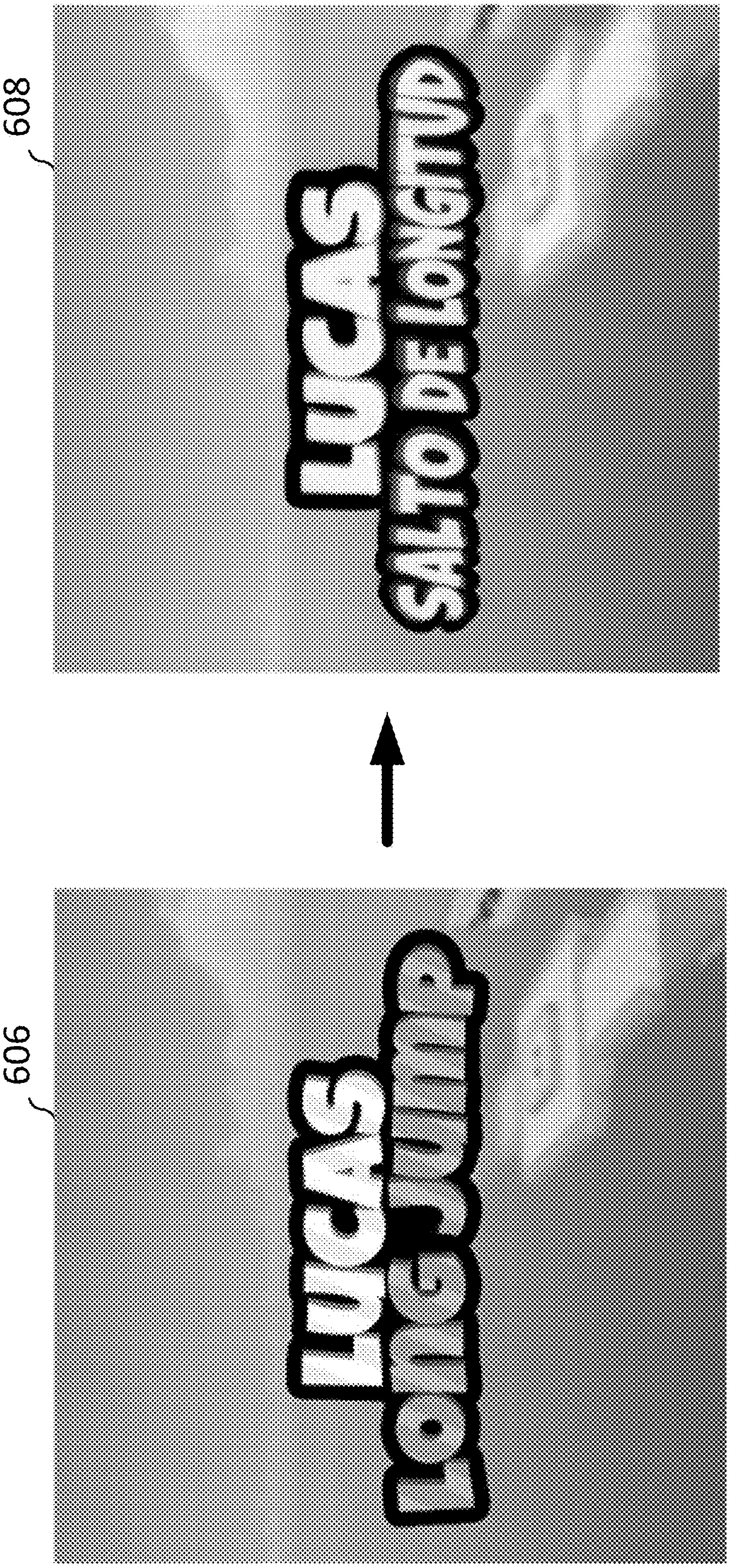
FIG. 6B is a diagram illustrating an example of a successful outcome of applying the described systems and methods for translating text within an image while preserving the original style, in accordance with some implementations.

FIG. 6B illustrates a successful outcome of applying the described systems and methods for translating text within an image while preserving the original style. The figure includes two images: the original image 606 and the output image 608.

The original image 606 is a promotional graphic for a game titled "LUCAS LONG JUMP." The text "LUCAS" is displayed prominently at the top in a bold, white font with a black outline. Below it, "LONG JUMP" is presented in a bold, blue gradient font with a similar black outline.

The output image 608 represents the result after applying the pre-trained diffusion model and the described methods to translate the text. The original text "LONG JUMP" has been accurately translated to "SALTO DE LONGITUD," the Spanish phrase for "long jump," while preserving the original style and visual attributes. The translated text integrates seamlessly with the rest of the image, maintaining the same font, color gradient, and stylistic effects as the original.

Figure 6C:
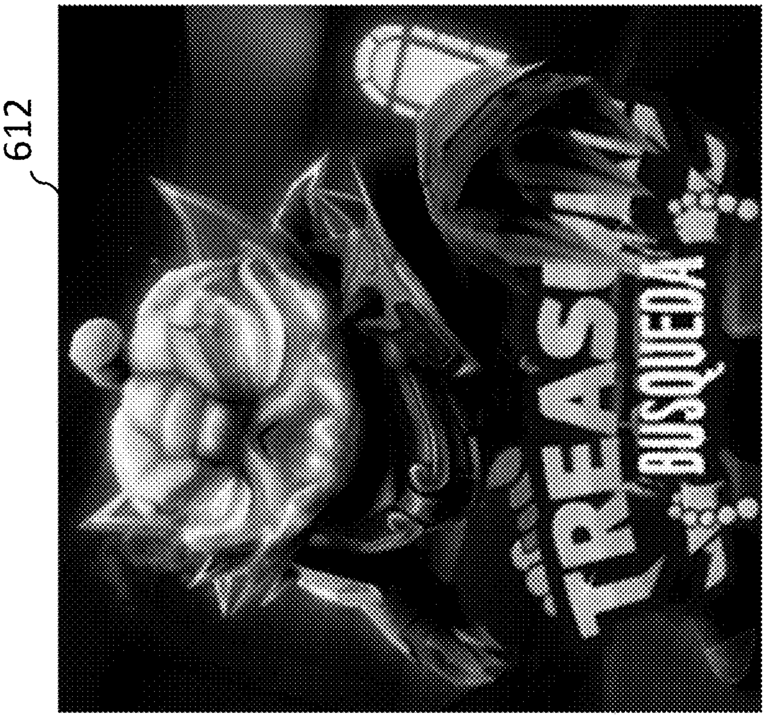
FIG. 6C is a diagram illustrating an example of a successful outcome of applying the described systems and methods for translating text within an image while preserving the original style, in accordance with some implementations.
Figure 6C:
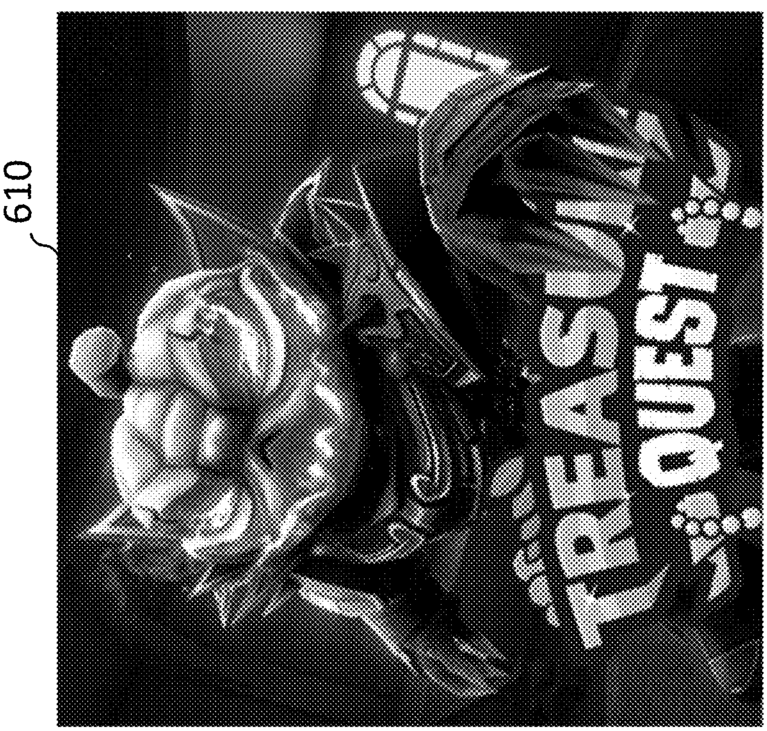

FIG. 6C illustrates a successful outcome of applying the described systems and methods for translating text within an image while preserving the original style. The figure includes two images: the original image 610 and the output image 612.

The original image 610 is a dynamic and visually striking promotional graphic for a game titled "TREASURE QUEST." The text "TREASURE" is displayed prominently in yellow with a bold font, while "QUEST" is shown in white with a matching bold font.

The output image 612 represents the result after applying the pre-trained diffusion model and the described methods to translate the text. The original text "QUEST" has been accurately translated to "BUSQUEDA," the Spanish word for "quest," while preserving the original style and visual attributes. The translated text integrates seamlessly with the rest of the image, maintaining the same font, color, and stylistic effects as the original.

Figure 7:
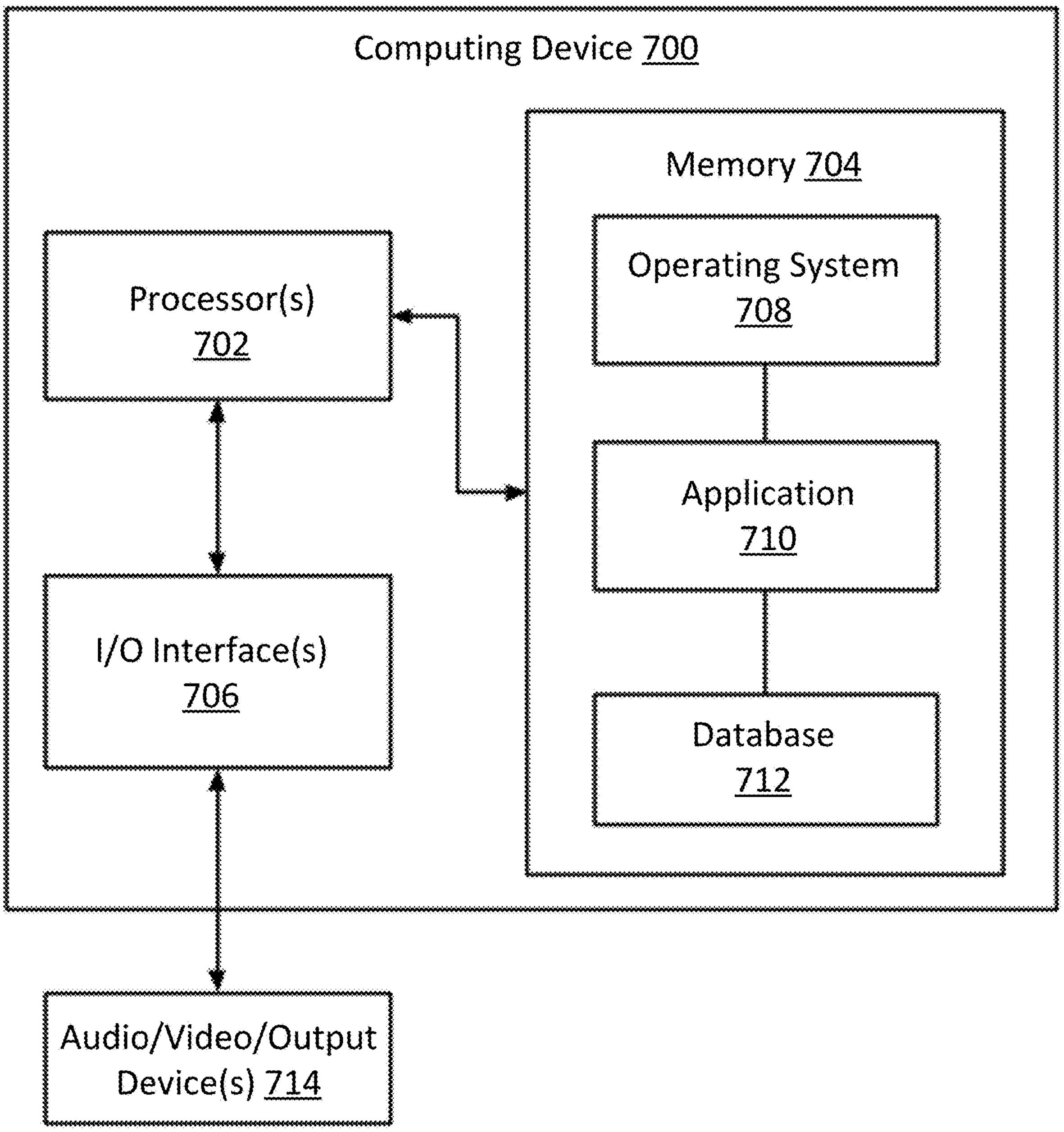
FIG. 7 is a block diagram that illustrates an example computing device, in accordance with some implementations.

FIG. 7 is a block diagram of an example computing device 700 which may be used to implement one or more techniques described herein. In one example, device 700 may be used to implement a computer device (e.g., 102 and/or 110 of FIG. 1), and perform appropriate method implementations described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 700 includes a processor 702, a memory 704, input/output (I/O) interface 706, and audio/video input/output devices 714.

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable computer-readable or processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, and a database 712 that may store data used by the components of device 700. In some implementations, applications 710 can include instructions that enable processor 702 to perform the functions (or control the functions of) described herein, e.g., some or all of the methods described with respect to FIG. 2. For example, applications 710 can include a module that implements one or more machine learning models used in techniques described herein, e.g., learned diffusion layers such as DiffusionNet, multi-layer perceptron, PointNet, or transformer self-attention layers. Applications 710 can include one or both of the loss functions of FIG. 3, that is, a) a squared L2-difference in the size similarity between the prediction and the ground truth, and/or b) a squared L2-difference in the directional similarity between the prediction and the ground truth. Database 712 (and/or other connected storage) can store various data used in described techniques, including input meshes of an avatar, quad meshes, output retopologized meshes, features 306, barycenters, local coordinate frames, etc.

Elements of software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 120), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 714 can a variety of devices including a user input device (e.g., a mouse, etc.) that can be used to receive user input, audio output devices (e.g., speakers), and a display device (e.g., screen, monitor, etc.) and/or a combined input and display device, which can be used to provide graphical and/or visual output.

For ease of illustration, FIG. 7 shows one block for each of processor 702, memory 704, I/O interface 706, and software blocks of operating system 708 and virtual experience application 710. These blocks may represent one or more processors or processing circuitries, operating systems, memories, I/O interfaces, applications, and/or software engines. In other implementations, device 700 may not have all of the components shown and/or may have other elements including other types of elements instead of, or in addition to, those shown herein. While the online virtual experience server 102 is described as performing operations as described in some implementations herein, any suitable component or combination of components of online virtual experience server 102, client device 110, or similar system, or any suitable processor or processors associated with such a system, may perform the operations described.

Device 700 can be a server device or client device. Example client devices or user devices can be computer devices including some similar components as the device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 200 and other described techniques) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, blocks, operations, or computations may be presented in a specific order, the order may be changed in different particular implementations. In some implementations, multiple steps or operations shown as sequential in this specification may be performed at the same time.

The invention claimed is:

1. A computer-implemented method comprising:
- obtaining an original image that includes text in a source language;
- recognizing content of the text in the original image and generating translated text comprising a translation of the content of the text, wherein the translated text is in a target language;
- determining a text region of the text in the original image, wherein the text region includes a subset of pixels of the original image;
- determining a style encoding for the text in the original image, wherein the style encoding is a mathematical representation of a visual style of the text in the original image;
- generating a masked version of the original image by setting the subset of pixels corresponding to the text region to a fixed value;
- generating a noisy version of the original image;
- providing the noisy version of the original image, the masked version of the original image, and the text region as direct inputs to a pre-trained diffusion model as part of an encoding and decoding process of the pre-trained diffusion model;
- providing the translated text and the style encoding as conditioning inputs to the pre-trained diffusion model, wherein the translated text and the style encoding are each projected via respective parameterized linear transformations that are trained during a training phase of the diffusion model to generate corresponding key and value vectors in an embedding space; and
- obtaining, as output of the diffusion model, an output image that includes the translated text, wherein a visual style of the translated text in the output image is same as the visual style of the text in the original image, wherein the output image is within a threshold visual distance of the original image, and wherein query vectors are generated from intermediate representations of the diffusion model during iterative denoising, cross-attention vectors are computed individually for the translated text and the style encoding using the query vectors and the corresponding key and value vectors, and attention outputs are incorporated into the intermediate representations through residual layers during iterative denoising of the noisy version of the original image.

2. The computer-implemented method of claim 1, wherein the original image comprises an image asset from a virtual experience.

3. The computer-implemented method of claim 1, further comprising rendering a virtual experience that includes the output image.

4. The computer-implemented method of claim 3, further comprising determining the target language based on one of: a user profile of a user that participates in a virtual experience, or a user location of the user.

5. The computer-implemented method of claim 1, wherein determining the text region in the original image comprises:
- identifying text pixels of the original image that correspond to the content of the text; and
- generating a bounding box that includes the text pixels, wherein providing the text region to the pre-trained diffusion model comprises providing the bounding box.

6. The computer-implemented method of claim 5, wherein generating the masked version of the original image comprises replacing pixel values of pixels within the bounding box with a fixed value.

7. The computer-implemented method of claim 1, wherein generating the translated text comprises:
- applying a translation algorithm to the content of the text to generate the translated text; and
- rendering the translated text in a font, wherein providing the translated text to the pre-trained diffusion model comprises providing the rendered translated text in the font.

8. The computer-implemented method of claim 7, wherein the content of the text includes one or more alphanumerical symbols, and further comprising:
- generating, using a text encoder, a set of vectors, wherein each vector of the set of vectors encodes a respective symbol of the one or more alphanumerical symbols, wherein providing the translated text to the pre-trained diffusion model further comprises providing the set of vectors.

9. The computer-implemented method of claim 1, wherein determining the style encoding for the text region of the original image comprises providing the text region of the original image as input to a style encoder, wherein the style encoder outputs the style encoding.

10. The computer-implemented method of claim 9, wherein the style encoder has a bottleneck architecture, wherein the text region of the original image is distilled into a vector that prevents memorization of the text while retaining visual attributes of the text region, wherein the visual attributes include color of the text, shape of the text, and combinations thereof.

11. The computer-implemented method of claim 1, further comprising providing a prompt as an additional conditioning input to the pre-trained diffusion model, wherein the prompt comprises a command to write the translated text in the output image.

12. The computer-implemented method of claim 1, wherein the conditioning inputs are provided as respective conditioning vectors to the pre-trained diffusion model, and further comprising:

computing the cross-attention vectors individually; and summing a contribution of the cross-attention vectors through the residual layers of the pre-trained diffusion model.

13. The computer-implemented method of claim 1, wherein the direct inputs are part of the encoding and decoding process of the pre-trained diffusion model, and wherein the conditioning inputs control output image generation of the pre-trained diffusion model.

14. The computer-implemented method of claim 1, wherein the diffusion model is trained by:

obtaining a training set, wherein each element of the training set comprises:

a training image, wherein the training image comprises text within a text region of the training image;

a noisy version of the training image;

a masked version of the training image, wherein a subset of pixels corresponding to the text region of the training image are set to a fixed value to mask the text region;

the text region of the training image; and a style encoding for the text in the training image, wherein the style encoding for the text in the training image is a mathematical representation of a visual style of the text in the training image; and training the diffusion model via self-supervised learning, wherein the training comprises, for each element in the training set:

providing the noisy version of the training image, the masked version of the training image, and the text region of the training image as direct inputs to the diffusion model;

providing original text from the text region and the style encoding for the text in the training image as conditioning inputs to the diffusion model;

generating, by the diffusion model, a particular output image, by iteratively denoising the noisy version of the training image;

determining a loss value based on a comparison of the particular output image and the training image; and modifying one or more parameters of the diffusion model based on the loss value.

15. A system comprising:

one or more processors; and memory coupled to the one or more processors storing instructions that, when executed by the one or more processors, cause the system to perform operations comprising:

obtaining an original image that includes text in a source language;

recognizing content of the text in the original image and generating translated text comprising a translation of the content of the text, wherein the translated text is in a target language;

determining a text region of the text in the original image, wherein the text region includes a subset of pixels of the original image;

determining a style encoding for the text in the original image, wherein the style encoding is a mathematical representation of a visual style of the text in the original image;

generating a masked version of the original image by setting the subset of pixels corresponding to the text region to a fixed value;

generating a noisy version of the original image;

providing the noisy version of the original image, the masked version of the original image, and the text region as direct inputs to a pre-trained diffusion model as part of an encoding and decoding process of the pre-trained diffusion model;

providing the translated text and the style encoding as conditioning inputs to the pre-trained diffusion model, wherein the translated text and the style encoding are each projected via respective parameterized linear transformations that are trained during a training phase of the diffusion model; and obtaining, as output of the diffusion model, an output image that includes the translated text, wherein a visual style of the translated text in the output image is same as the visual style of the text in the original image, wherein the output image is within a threshold visual distance of the original image, and wherein query vectors are generated from intermediate representations of the diffusion model during iterative denoising, cross-attention vectors are computed individually for the translated text and the style encoding, and resulting attention outputs are incorporated through residual connections during the iterative denoising.

16. The system of claim 15, wherein the original image comprises an image asset from a virtual experience.

17. The system of claim 15, wherein the instructions further cause the system to perform an operation comprising rendering a virtual experience that includes the output image.

18. The system of claim 15, wherein the instructions further cause the system to perform an operation comprising determining the target language based on one of: a user profile of a user that participates in a virtual experience, or a user location of the user.

19. The system of claim 15, wherein determining the text region in the original image comprises:

identifying text pixels of the original image that correspond to the content of the text; and generating a bounding box that includes the text pixels, wherein providing the text region to the pre-trained diffusion model comprises providing the bounding box.

20. A non-transitory computer-readable medium containing instructions comprising:

obtaining an original image that includes text in a source language;

recognizing content of the text in the original image and generating translated text comprising a translation of the content of the text, wherein the translated text is in a target language;

determining a text region of the text in the original image, wherein the text region includes a subset of pixels of the original image;

determining a style encoding for the text in the original image, wherein the style encoding is a mathematical representation of a visual style of the text in the original image;

generating a masked version of the original image by setting the subset of pixels corresponding to the text region to a fixed value;

generating a noisy version of the original image;

providing the noisy version of the original image, the masked version of the original image, and the text region as direct inputs to a pre-trained diffusion model as part of an encoding and decoding process;

providing the translated text and the style encoding as conditioning inputs to the pre-trained diffusion model, wherein each conditioning input is projected via a respective parameterized linear transformation that is trained during a training phase of the diffusion model; and obtaining, as output of the diffusion model, an output image that includes the translated text, wherein a visual style of the translated text in the output image is same as the visual style of the text in the original image, wherein the output image is within a threshold visual distance of the original image, and wherein cross-attention vectors are computed individually using query vectors derived from intermediate representations of the diffusion model during iterative denoising and are incorporated through residual layers.

* * * * *